United States Patent
Miyafuji

(10) Patent No.: US 10,954,419 B2
(45) Date of Patent: Mar. 23, 2021

(54) CURABLE COMPOSITION

(71) Applicant: Kaneka Corporation, Osaka (JP)

(72) Inventor: Kiyoshi Miyafuji, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 191 days.

(21) Appl. No.: 15/943,198

(22) Filed: Apr. 2, 2018

(65) Prior Publication Data

US 2018/0223139 A1 Aug. 9, 2018

Related U.S. Application Data

(63) Continuation of application No. PCT/JP2016/079103, filed on Sep. 30, 2016.

(51) Int. Cl.

| | | |
|---|---|---|
| *C08L 71/02* | (2006.01) | |
| *C09J 133/10* | (2006.01) | |
| *C09K 3/10* | (2006.01) | |
| *C09J 133/08* | (2006.01) | |
| *C09J 183/12* | (2006.01) | |
| *C09J 133/14* | (2006.01) | |
| *C08L 55/00* | (2006.01) | |
| *C08F 290/04* | (2006.01) | |
| *C08F 20/18* | (2006.01) | |
| *C09J 143/04* | (2006.01) | |
| *C08F 2/38* | (2006.01) | |

(52) U.S. Cl.
CPC ............ *C09J 133/10* (2013.01); *C08F 20/18* (2013.01); *C08F 290/04* (2013.01); *C08L 55/00* (2013.01); *C08L 71/02* (2013.01); *C09J 133/08* (2013.01); *C09J 133/14* (2013.01); *C09J 143/04* (2013.01); *C09J 183/12* (2013.01); *C09K 3/10* (2013.01); *C08F 2/38* (2013.01); *C08F 2438/02* (2013.01)

(58) Field of Classification Search
CPC .......... C08L 71/02; C08L 55/00; C08L 33/08; C08L 43/04
See application file for complete search history.

(56) References Cited

U.S. PATENT DOCUMENTS

| | | | |
|---|---|---|---|
| 4,618,656 A | 10/1986 | Kawakubo et al. | |
| 2007/0167583 A1* | 7/2007 | Yano | ................. C08J 3/246 525/474 |
| 2016/0137872 A1 | 5/2016 | Miyafuji et al. | |

FOREIGN PATENT DOCUMENTS

| | | |
|---|---|---|
| JP | S52-73998 A | 6/1977 |
| JP | S59-122541 A | 7/1984 |
| JP | S60-228516 A | 11/1985 |
| JP | H05-320608 A | 12/1993 |
| JP | H06-336583 A | 12/1994 |
| JP | 2005-042072 A | 2/2005 |
| JP | 2005105179 A | 4/2005 |
| JP | 2006-299240 A | 11/2006 |
| JP | 2010-126680 A | 6/2010 |
| WO | 2014/192842 A1 | 12/2014 |

OTHER PUBLICATIONS

Notification of Reasons for Refusal issued in Japanese Patent Application No. 2017-543635; dated Dec. 11, 2018 (7 pages).
Supplementary European Search Report issued in European Application No. 16851888.4, dated Jun. 12, 2018 (4 pages).
International Search Report issued in International Application No. PCT/JP2016/079103, dated Dec. 13, 2016 (2 pages).

* cited by examiner

*Primary Examiner* — Margaret G Moore

(74) *Attorney, Agent, or Firm* — Osha Bergman Watanabe & Burton LLP

(57) ABSTRACT

A curable composition includes a (meth)acrylic acid ester polymer (A), wherein the (meth)acrylic acid ester polymer (A) includes a monomer and a macromonomer (a). The monomer includes a reactive silicon group represented by the general formula (1): —SiR$^1_a$X$_{3-a}$ (1) (in the formula, R$^1$ represents a substituted or unsubstituted hydrocarbon group with 1 to 20 carbon atoms, X each independently represents a hydroxyl group or a hydrolyzable group, and a represents 0 or 1.) and a polymerizable unsaturated group. The macromonomer (a) is a (meth)acrylic acid ester polymer having a polymerizable unsaturated group.

4 Claims, No Drawings

CURABLE COMPOSITION

TECHNICAL FIELD

One or more embodiments of the present invention relate to a curable composition containing an organic polymer having a silicon group (hereinbelow to be also referred to as "reactive silicon group") which has a hydroxyl group or a hydrolyzable group on a silicon atom, and can form a siloxane bond.

BACKGROUND

An organic polymer having a reactive silicon reacts even at room temperature as caused by moisture or the like. It is known that this organic polymer is crosslinked by siloxane condensation reaction of a reactive silicon group to yield a cured product in rubber state. Among the organic polymers, by having relatively low viscosity, a polyoxyalkylene polymer having a reactive silicon group exhibits excellent workability during preparation of a blend composition or use thereof. Furthermore, from the viewpoint of having good performance balance such as physical properties, weather resistance, or dynamic durability of a cured product which is obtained therefrom, it is widely used for applications such as sealing material, adhesive, paint and the like (Patent Document 1). By blending various kinds of a component like a filler or a plasticizer, workability or various physical properties of a curable composition containing an organic polymer having a reactive silicon group can be adjusted. When it is desired to have weather resistance or adhesiveness, it is advantageous to use a reactive silicon group-containing polyoxyalkylene polymer and a reactive silicon group-containing (meth)acrylic acid ester polymer in combination (Patent Document 2). They are used as a sealant with high weather resistance or an adhesive for industrial use.

[Patent Document 1] Japanese Unexamined Patent Application, Publication No. S52-73998
[Patent Document 2] Japanese Unexamined Patent Application, Publication No. S59-122541

To increase the adhesiveness of an organic polymer having a reactive silicon group to each adherend, a method of using a (meth)acrylic acid ester polymer with high Tg is known. However, there remains room for improvement to ensure the adhesiveness to a broad range of adherends. Furthermore, there is also a case in which, as the viscosity of a composition increases by using a polymer with high Tg, poor workability is yielded. One or more embodiments of the present invention provide a curable composition which has a low viscosity and exhibits good adhesiveness to a broad range of adherends.

SUMMARY

One or more embodiments of the present invention are described herein.

One or more embodiments of the present invention relate to the followings:

(1). A curable composition which contains a (meth)acrylic acid ester polymer (A) having as constituent monomers a monomer having a reactive silicon group represented by the general formula (1):

$$-SiR^1_a X_{3-a} \quad (1)$$

(in the formula, $R^1$ represents a substituted or unsubstituted hydrocarbon group with 1 to 20 carbon atoms, X each independently represents a hydroxyl group or a hydrolyzable group, and a represents 0 or 1.)
and a polymerizable unsaturated group, and a macromonomer (a) having a polymerizable unsaturated group, in which the macromonomer (a) is a (meth)acrylic acid ester polymer;

(2). The curable composition described in (1), in which the polymerizable unsaturated group of the macromonomer (a) has a structure that is represented by the following general formula (2):

$$CH_2=C(R^8)-COO-Z \quad (2)$$

(in the formula, $R^8$ represents a hydrogen or a methyl group, and Z represents a polymer main chain.);

(3). The curable composition described in (1) or (2), in which the macromonomer (a) has molecular weight distribution (Mw/Mn) of 1.5 or less, glass transition temperature (Tg) of lower than 50° C., and number average molecular weight of 1,000 to 30,000;

(4). The curable composition described in any one of (1) to (3), in which Tg of the macromonomer (a) (branch chain) is lower than Tg of a stem chain constituting the polymer (A);

(5). The curable composition described in any one of (1) to (4), in which the monomer constituting the macromonomer (a) contains alkyl (meth)acrylate in which the alkyl has 1 to 6 carbon atoms and alkyl (meth)acrylate in which the alkyl has 7 to 30 carbon atoms;

(6). The curable composition described in any one of (1) to (5), in which the curable composition is used after being mixed with a polyoxyalkylene-based polymer (B) having a reactive silicon group represented by the general formula (1);

(7). A curable composition which contains a (meth)acrylic acid ester polymer (A) having as constituent monomers a monomer having a reactive silicon group represented by the general formula (1):

$$-SiR^1_a X_{3-a} \quad (1)$$

(in the formula, $R^1$ represents a substituted or unsubstituted hydrocarbon group with 1 to 20 carbon atoms, X each independently represents a hydroxyl group or a hydrolyzable group, and a represents 0 or 1.)
and a polymerizable unsaturated group, and a macromonomer (a) having a polymerizable unsaturated group; and
a polyoxyalkylene-based polymer (B) having a reactive silicon group represented by the general formula (1), in which the macromonomer (a) is a (meth)acrylic acid ester polymer;

(8). The curable composition described in (7), in which, with regard to the reactive silicon group contained in the polyoxyalkylene-based polymer (B), a in the general formula (1) is 1;

(9). A sealing material composition containing the curable composition described in any one of (1) to (8);

(10). An adhesive composition containing the curable composition described in any one of (1) to (8);

(11). A cured product of the curable composition described in any one of (1) to (8);

(12). A method for producing a curable composition which contains a (meth)acrylic acid ester polymer (A) having as constituent monomers a monomer having a reactive silicon group represented by the general formula (1):

$$-SiR^1_a X_{3-a} \quad (1)$$

(in the formula, $R^1$ represents a substituted or unsubstituted hydrocarbon group with 1 to 20 carbon atoms, X each independently represents a hydroxyl group or a hydrolyzable group, and a represents 0 or 1.)

and a polymerizable unsaturated group, and a macromonomer (a) as a (meth)acrylic acid ester polymer having a polymerizable unsaturated group, in which the macromonomer (a) is a (meth)acrylic acid ester polymer and the macromonomer (a) is synthesized by living radical polymerization method.

The curable composition according to one or more embodiments of the present invention has relatively low viscosity in spite of the molecular weight and provides a cured product which has favorable adhesiveness to various adherends.

DETAILED DESCRIPTION OF THE EMBODIMENTS

The curable composition according to one or more embodiments of the present invention contains essentially the aforementioned polymer (A). It is also preferable that the curable composition contains the aforementioned polymer (A) and polymer (B). In the curable composition according to one or more embodiments of the present invention, only one kind of the aforementioned polymer (A), polymer (B), and the below-mentioned other components may be used or two or more types thereof may be used in combination. Each component is explained in order hereinbelow.

<Polymer (A)>

The (meth)acrylic acid ester polymer (A) is a polymer which has as constituent monomers the monomer having a reactive silicon group represented by the general formula (1):

(in the formula, $R^1$ represents a substituted or unsubstituted hydrocarbon group with 1 to 20 carbon atoms. X each independently represents a hydroxyl group or a hydrolyzable group. a represents 0 or 1.)

and a polymerizable unsaturated group, and the macromonomer (a) of a (meth)acrylic acid ester polymer having a polymerizable unsaturated group. In one or more embodiments of the present invention, "(meth)acryl" indicates "acryl and/or methacryl".

The (meth)acrylic acid ester polymer (A) has the reactive silicon group represented by the general formula (1) on the molecular chain terminal and/or the side chain.

Examples of $R^1$ in the general formula (1) include an alkyl group such as methyl group or ethyl group; a cycloalkyl group such as cyclohexyl group; an aryl group such as phenyl group, an aralkyl group such as benzyl group; a triorganosiloxy group represented by —OSi(R')$_3$ (R' each independently represents an alkyl group (for example, methyl group) or an aryl group (for example, phenyl group)); a fluoroalkyl group such as fluoromethyl group or difluoromethyl group; a chloroalkyl group such as chloromethyl group or 1-chloroethyl group; an alkoxyalkyl group such as methoxymethyl group, ethoxymethyl group, phenoxymethyl group, or 1-methoxyethyl group; an aminoalkyl group such as aminomethyl group, N-methylaminomethyl group, or N,N-dimethylaminomethyl group; an acetoxymethyl group; a methylcarbamate group; and a 2-cyanoethyl group. From the viewpoint of the obtainability of raw materials, $R^1$ is preferably a methyl group.

As for the hydrolyzable group represented by X in the general formula (1), a known hydrolyzable group can be mentioned. Herein, the hydrolyzable group means a group which reacts and dissociates in the presence of water. Examples of the hydrolyzable group include a hydrogen, a halogen, an alkoxy group, an alkenyloxy group, an aryloxy group, an acyloxy group, an amino group, an amide group, an aminooxy group, and a mercapto group. Among them, due to high activity, a halogen, an alkoxy group (for example, methoxy group and ethoxy group), an alkenyloxy group (for example, isopropenyloxy group (other name: isopropenoxy group)), and an acyloxy group are preferable, and from the view point of easy handlability by having mild hydrolyzability, an alkoxy group is more preferable, and a methoxy group and an ethoxy group are particularly preferable. Furthermore, in a case in which the hydrolyzable group is an ethoxy group or an isopropenyloxy group, the compound which leaves according to the hydrolysis is ethanol and acetone, respectively. Due to such reasons, an ethoxy group and an isopropenyloxy group are preferable as a hydrolyzable group from the viewpoint of the safety.

The reactive silicon group represented by the general formula (1) may be either one type or two or more types. Specifically, preferred are a trimethoxysilyl group, a triethoxysilyl group, a tris(2-propenyl oxy)silyl group, a triacetoxysilyl group, a dimethoxymethylsilyl group, a diethoxymethylsilyl group, a diisopropoxymethylsilyl group, a (chloromethyl)dimethoxysilyl group, a (methoxymethyl)dimethoxysilyl group, a (methoxymethyl)diethoxysilyl group, and an (ethoxy methyl)dimethoxysilyl group, and from the viewpoint of easy handlability by having mild hydrolyzability, a dimethoxymethylsilyl group is more preferable and a trimethoxysilyl group is preferable from the viewpoint of obtaining a composition with high curing rate.

Examples of the monomer having a reactive silicon group and a polymerizable unsaturated group include a compound having a (meth)acryloxy group and a reactive silicon group such as 3-(meth)acryloxypropyltrimethoxysilane, 3-(meth)acryloxypropyltriethoxysilane, 3-(meth)acryloxypropyldimethoxymethylsilane, (meth)acryloxymethyltrimethoxysilane, or (meth)acryloxymethyldimethoxymethylsilane; and a compound having a vinyl group and a reactive silicon group such as vinyltrimethoxysilane or vinyltriethoxysilane. Those compounds may be used either singly or in combination of two or more types thereof. Content of the monomer having a reactive silicon group and a polymerizable unsaturated group in the entire monomers constituting the polymer (A) is preferably 0.1 to 90% by weight, more preferably 0.5 to 50% by weight, and even more preferably 1 to 30% by weight.

The main chain skeleton of the macromonomer (a) having a polymerizable unsaturated group for constituting the polymer (A) is a (meth)acrylic acid ester polymer. The monomers constituting the (meth)acrylic acid ester polymer are not particularly limited. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, stearyl (meth)acrylate, phenyl (meth)acrylate, toluene (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, ethylene oxide adduct of (meth)acrylic acid, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl) methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, dimethylaminoethyl (meth)acrylate, chloroethyl (meth)acrylate, tetrahydrofurfuryl (meth)acrylate, glycidyl (meth)acrylate, and 2-aminoethyl (meth)acrylate.

As the monomer constituting the (meth)acrylic acid ester polymer, other monomer exhibiting a copolymerization property with the above monomers can be also used. Examples of the other monomer include styrene-based monomers such as styrene, vinyl toluene, α-methylstyrene, chlorostyrene, and styrene sulfonic acid; fluorine-containing vinyl monomers such as perfluoroethylene, perfluoropropylene, or vinylidene fluoride; maleic acid and derivatives thereof such as maleic acid, maleic anhydride, monoalkyl ester of maleic acid, or dialkyl ester of maleic acid; fumaric acid or derivatives thereof such as fumaric acid, monoalkyl ester of fumaric acid, or dialkyl ester of fumaric acid; maleimide-based monomers such as maleimide, methyl maleimide, ethyl maleimide, propyl maleimide, butyl maleimide, hexyl maleimide, octyl maleimide, dodecyl maleimide, stearyl maleimide, phenyl maleimide, or cyclohexyl maleimide; vinyl ester-based monomers such as vinyl acetate, vinyl propionate, vinyl pivalate, vinyl benzoate, or vinyl cinnamate; olefin-based monomers such as ethylene or propylene; conjugated diene-based monomers such as butadiene or isoprene; (meth)acrylate; (meth)acrylonitrile: and vinyl-based monomers such as vinyl chloride, vinylidene chloride, allyl chloride, allyl alcohol, ethyl vinyl ether, or butyl vinyl ether. Other monomer may be used either singly or in combination of two or more types thereof.

The macromonomer (a) is a polymerizable polymer constituting the polymer (A), and it should have a polymerizable unsaturated group. The polymerizable unsaturated group can be present on any one of the molecular chain terminal and side chain, but, from the viewpoint of the adhesiveness, it is preferably present on the molecular chain terminal.

The polymerizable unsaturated group is not particularly limited as long as it is an unsaturated group that can be polymerized by a general radical polymerization method, and examples thereof include an acryloyl group, a methacryloyl group, a vinyl group, an allyl group, and a methallyl group. From the viewpoint of exhibiting a favorable polymerization property, an acryloyl group and a methacryloyl group are preferable.

The method for introducing a polymerizable unsaturated group to the macromonomer (a) is not particularly limited, and for example, the methods that are represented by the following (i) to (iii) can be used.
(i) A method of copolymerizing a monomer having different kinds of a polymerizable unsaturated group with different reactivity (for example, allyl acrylate) with a monomer having (meth)acryl structure.
(ii) A method of copolymerizing a compound having a polymerizable unsaturated group and a reactive functional group (Z group) (for example, acrylic acid and 2-hydroxyethyl acrylate) with a monomer having (meth)acryl structure followed by reaction with a compound having a polymerizable unsaturated group and a functional group which can react with the Z group (for example, (meth)acrylic acid diethylisocyanate).
(iii) A method of polymerizing a monomer (b) having (meth)acryl structure by a living radical polymerization method followed by introduction of a polymerizable unsaturated group to the molecular chain terminal.

Furthermore, two or more of those methods can be used in arbitrary combination. Among those methods, it is preferable to use the method of (iii) because a polymerizable unsaturated group can be introduced to the molecular chain terminal.

The polymerizable unsaturated group of the macromonomer (a) preferably has a structure that is represented by the following general formula (2):

$$CH_2=C(R^8)-COO-Z \quad (2)$$

(in the formula, $R^8$ represents a hydrogen or a methyl group. Z represents a polymer main chain.).

When $R^9$ is a hydrogen or a methyl group, the polymerization property is lowered, and thus not desirable.

The number average molecular weight of the macromonomer (a) is 1,000 or more, more preferably 3,000 or more, and particularly preferably 5,000 or more, and the upper limit is 50,000 or less, and more preferably 30,000 or less. If the number average molecular weight of the macromonomer (a) is low, viscosity of the polymer (A) is low, but there is a tendency of not obtaining favorable adhesiveness. On the other hand, if the number average molecular weight of the macromonomer (a) is excessively high, the viscosity is excessively high so that there is a tendency of having poor handlability.

The molecular weight distribution (weight average molecular weight (Mw)/number average molecular weight (Mn)) of the macromonomer (a) is, although not particularly limited, preferably narrow, and it is more preferably less than 2.0, more preferably 1.6 or less, particularly preferably 1.5 or less, more particularly preferably 1.4 or less, even more particularly preferably 1.3 or less, and most preferably 1.2 or less.

The number average molecular weight (Mn) and weight average molecular weight (Mw) of the macromonomer (a) indicate a value measured by GPC (based on polystyrene), and the detailed measurement method thereof is described in Synthesis Example 1 that is described below. The method for measuring the number average molecular weight (Mn) or the like of other components (the polymer (A), the polymer (B), a high molecular weight plasticizer, or the like) is the same as above. The polymer (A) is constituted with the macromonomer (a) and other monomers. The main chain of the polymer (A) is referred to as a stem chain and the branched high molecular chain constituted with the macromonomer (a) is referred to as a branch chain. The monomers constituting the stem chain and branch chain are constituted with the monomers that are described above, and they are not particularly limited. From the viewpoint of obtaining favorable adhesiveness, Tg of the branch chain is preferably lower than Tg of the stem chain.

Tg of the stem chain is preferably −60° C. to 150° C., more preferably 0° C. to 130° C., and even more preferably 30° C. to 100° C.

Tg of the branch chain is preferably −100° C. to 150° C., more preferably −90° C. to 100° C., and even more preferably −80° C. to 50° C. Tg is a value which is obtained from the following Fox equation. Fox equation:

$$1/(Tg(K))=\Sigma(Mi/Tgi)$$

(in the formula, Mi represents the weight fraction of the monomer component i constituting the polymer, and Tgi represents the glass transition temperature (K) of a homopolymer of the monomer i).

With regard to the glass transition temperature of a homopolymer, the glass transition temperature (Tg) described in POLYMER HANDBOOK-FOURTH EDITION-(J. Brandrup) is referenced. When Tg is calculated from Fox equation, calculation is made without including the monomer having a reactive silicon group. Content of the macromonomer (a) in the entire monomers constituting the polymer (A) is preferably 1 to 90% by weight, more preferably 5 to 70% by weight, and even more preferably 10 to 50% by weight.

The macromonomer of the polymer (A) can be introduced to any one of the molecular chain terminal and the side chain, and from the viewpoint of the adhesiveness, it is preferably introduced to the side chain. Number of the macromonomer in one molecule of the polymer (A) is, on average, preferably 0.01 or more, more preferably 0.03 or more, and even more preferably 0.05 or more, and preferably 2.0 or less, more preferably 1.5 or less, and even more preferably 1.3 or less. It is possible that the monomer constituting the main chain structure of the (meth)acrylic acid ester polymer (A) contains a monomer having the reactive silicon group represented by the general formula (1) or a monomer other than the macromonomer (a). The monomer is not particularly limited as long as it is a (meth)acrylic acid ester monomer or other monomer exhibiting a copolymerization property with a (meth)acrylic acid ester monomer. Examples of the (meth)acrylic acid ester monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, stearyl (meth)acrylate, phenyl (meth)acrylate, toluene (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, ethylene oxide adduct of (meth)acrylic acid, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth) acrylate, 2-perfluorohexadecylethyl (meth)acrylate, dimethylaminoethyl (meth)acrylate, chloroethyl (meth) acrylate, tetrahydrofurfuryl (meth)acrylate, glycidyl (meth) acrylate, and 2-aminoethyl (meth)acrylate. Among them, methyl (meth)acrylate and stearyl (meth)acrylate are preferable from the viewpoint of the compatibility with the component (B), adhesiveness to a substrate, and obtainability. Examples of other monomer exhibiting a copolymerization property with the (meth)acrylic acid ester polymer include styrene-based monomers such as styrene, vinyl toluene, α-methylstyrene, chlorostyrene, and styrene sulfonic acid; flulorine-containing vinyl monomers such as perfluoroethylene, perfluoropropylene, or vinylidene fluoride; maleic acid and derivatives thereof such as maleic acid, maleic anhydride, monoalkyl ester of maleic acid, or dialkyl ester of maleic acid; fumaric acid or derivatives thereof such as fumaric acid, monoalkyl ester of fumaric acid, or dialkyl ester of fumaric acid; maleimide-based monomers such as maleimide, methyl maleimide, ethyl maleimide, propyl maleimide, butyl maleimide, hexyl maleimide, octyl maleimide, dodecyl maleimide, stearyl maleimide, phenyl maleimide, or cyclohexyl maleimide; vinyl ester-based monomers such as vinyl acetate, vinyl propionate, vinyl pivalate, vinyl benzoate, or vinyl cinnamate; olefin-based monomers such as ethylene or propylene; conjugated diene-based monomers such as butadiene or isoprene; (meth)acrylamide; (meth)acrylonitrile: and vinyl-based monomers such as vinyl chloride, vinylidene chloride, allyl chloride, allyl alcohol, ethyl vinyl ether, or butyl vinyl ether. Other monomer may be used either singly or in combination of two or more types thereof. Content of the monomer in the entire monomers constituting the polymer (A) is preferably 10 to 99% by weight, more preferably 30 to 95% by weight, and even more preferably 50 to 90% by weight.

The polymer (A) can be obtained by various kinds of a polymerization method, and the polymerization method is not particularly limited. From the viewpoint of the general usability and easy controllability, the radical polymerization method is preferable.

The radical polymerization method can be categorized into a "general radical polymerization method" and a "controlled radical polymerization method". The "general radical polymerization method" is a simple polymerization method in which the polymerization is simply carried out by using a polymerization initiator such as an azo compound or a peroxide. Meanwhile, the "controlled radical polymerization method" is a method which enables introduction of a specific functional group to a controlled position like a terminal. The "controlled radical polymerization method" can be further categorized into a "chain transfer agent method" and a "living radical polymerization method". The "chain transfer agent method" is characterized by carrying out the polymerization by using a chain transfer agent having a specific functional group, and a vinyl polymer having a functional group on a terminal is obtained by the method. Meanwhile, the "living radical polymerization method" is characterized by having growth of a polymer growth terminal without having a side reaction like termination reaction, and a polymer with a molecular weight that is almost the same as designed is obtained by the method. In one or more embodiments of the present invention, it is possible to use any one of those polymerization methods.

As for the "general radical polymerization method", a solution polymerization method or a bulk polymerization in which the polymerization is carried out at 50 to 150° C. after adding a polymerization initiator, a chain transfer agent, a solvent or the like can be specifically mentioned.

Examples of the polymerization initiator include an azo compound such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis [N-(2-propenyl)-2-methylpropionamide], or 1,1'-azobis(cyclohexane-1-carbonitrile); diacyl peroxide such as benzoyl peroxide, isobutyryl peroxide, isononanoyl peroxide, decanoyl peroxide, lauroyl peroxide, parachlorobenzoyl peroxide, or di(3, 5,5-trimethylhexanoyl) peroxide; peroxy dicarbonate such as diisopropylperoxy dicarbonate, di-sec-butylperoxy dicarbonate, di-2-ethylhexylperoxy dicarbonate, di-1-methylheptylperoxy dicarbonate, di-3-methoxybutylperoxy dicarbonate, or dicyclohexylperoxy dicarbonate; peroxy ester such as tert-butylperoxybenzoate, tert-butylperoxyacetate, tert-butylperoxy-2-ethylhexanoate, tert-butylperoxyisobutyrate, tert-butylperoxypyvalate, tert-butyldiperoxyadipate, or cumylperoxyneodecanoate; ketone peroxide such as methyl ethyl ketone peroxide or cyclohexanone peroxide; dialkyl peroxide such as di-tert-butyl peroxide, dicumyl peroxide, tert-butylcumyl peroxide, or 1,1-di(tert-hexylperoxy)-3,3,5-trimethylcyclohexane; hydroperoxide such as cumene hydroxy peroxide or tert-butylhydro peroxide; and peroxide such as 1,1-di(tert-hexylperoxy)-3,3,5-trimethylcyclohexane. Those polymerization initiators may be used either singly or in combination of two or more types thereof.

Examples of the chain transfer agent include a mercapto group-containing compound such as n-dodecyl mercaptan, tert-dodecyl mercaptan, or lauryl mercaptan. Furthermore, when it is desired to introduce a reactive silicon group to the molecular chain terminal of a (meth)acryl polymer, it is preferable to use a compound which has a reactive silicon group and a mercapto group such as 3-mercaptopropyltrimethoxysilane, 3-mercaptopropylmethyldimethoxysilane, 3-mercaptopropyl chloromethyldimethoxysilane, 3-mercaptopropyl methoxymethyldimethoxysilane, (mercaptomethyl)dimethoxymethylsilane, or (mercaptomethyl)trimethoxysilane. They may be used either singly or in combination of two or more types thereof. If it is desired to obtain a cured product with excellent weather resistance, it is preferable that the mercapto group-containing compound is not used during the polymerization.

Examples of the solvent include aromatic compounds such as toluene, xylene, styrene, ethylbenzene, paradichlorobenzene, di-2-ethylhexyl phthalate, or di-n-butyl phthalate; hydrocarbon compounds such as hexane, heptane, octane, cyclohexane, or methylcyclohexane; carboxylic acid ester compounds such as butyl acetate, n-propyl acetate, or isopropyl acetate; ketone compounds such as methyl isobutyl ketone or methyl ethyl ketone; dialkyl carbonate compounds such as dimethyl carbonate or diethyl carbonate; and alcohol compounds such as n-propanol, 2-propanol, n-butanol, 2-butanol, isobutanol, tert-butanol, or amyl alcohol. Among them, from the viewpoint of malodor and environmental load, or the like, one or more solvents selected from dialkyl carbonate compounds and alcohol compounds are preferred. Moreover, dimethyl carbonate, n-propanol, 2-propanol, n-butanol, 2-butanol, isobutanol, and tert-butanol are more preferred, with 2-propanol or isobutanol being particularly preferred from the viewpoint of suppressing the emission property of all the volatile organic compounds from the composition and the boiling point. The emission property of all the volatile organic compounds from the composition is based on the measurement method according to GEV Specification and Classification Criteria (edition: Feb. 14, 2001) prescribed by GEV (Gemeinschaft Emissionskontrollierte Verlegewerkstoffe, e.V.).

Furthermore, for the synthesis of the polymer (A), it is also possible that the polymerization of the monomers of the polymer (A) is carried out with the polymer (B) and a precursor compound thereof, a plasticizer which will be described later, or the like.

The "chain transfer agent method" is a method which allows quantitative introduction of a functional group to the polymer terminal as compared to "general radical polymerization method". Examples of the radical polymerization using a chain transfer agent include, although not particularly limited, a method of obtaining a polymer with halogen terminal by using a halogenated hydrocarbon as a chain transfer agent as disclosed in Japanese Unexamined Patent Application, Publication No. H4-132706, and a method of obtaining a polymer with hydroxyl group terminal by using mercaptan containing hydroxyl group or polysulfide containing hydroxyl group as a chain transfer agent as disclosed in Japanese Unexamined Patent Application, Publication No. S61-271306, Japanese Patent No. 2594402, and Japanese Unexamined Patent Application, Publication No. S54-47782.

Unlike the above polymerization method, the "living radical polymerization method" is a polymerization method which allows obtainment of a polymer having any molecular weight, a narrow molecular weight distribution, and a low viscosity, and further allows introduction of a monomer containing a specific functional group into almost any site of the polymer. Furthermore, the living polymerization in a narrow sense refers to a polymerization in which the chain terminals are always kept active and the molecular chain continues growing, but in general, it also includes quasi-living polymerization in which growth is obtained while the molecular chain with the inactivated terminal and the molecular chain with activated chain terminal are in an equilibrium state. Examples of the "living radical polymerization method" include a method using cobalt porphyrin complex as described in Journal of the American Chemical Society (J. Am. Chem. Soc.), 1994, vol. 116, p. 7943, a method using nitroxide radical as described in Japanese Patent, Publication No. 2003-500378, and an atom transfer radical polymerization (ATRP) method using an initiator such as organic halide or halogenated sulfonyl compound and a catalyst such as transition metal complex as described in Japanese Unexamined Patent Application, Publication No. H11-130931. Also included in the atom transfer radical polymerization method is so-called reverse atom transfer radical polymerization as described in Macromolecules, 1999, vol. 32, p. 2872. The reverse atom transfer radical polymerization is a polymerization method which produces a highly oxidized state as obtained when radicals are generated by a common atom transfer radical polymerization catalyst (for example, by reacting a common radical initiator such as peroxide with Cu (II) when Cu (I) is used as a catalyst, thereby producing the same equilibrium state as the atom transfer radical polymerization).

As a polymerization method other than those described above, a method in which a metallocene catalyst and a thiol compound having at least one reactive silicon group in the molecule are used to obtain an acrylic polymer as disclosed in Japanese Unexamined Patent Application, Publication No. 2001-040037, and a high temperature continuous polymerization method in which a mixing tank reactor is used to continuously polymerize a vinyl monomer as disclosed in Japanese Patent, Publication No. S57-502171, Japanese Unexamined Patent Application, Publication No. S59-006207, and Japanese Unexamined Patent Application, Publication No. S60-511992 can be also used.

The method for introducing a reactive silicon group into a (meth)acrylic acid ester polymer is not particularly limited, and the following methods (I) to (IV) may be used, for example.
(I) A method of copolymerizing a compound having a polymerizable unsaturated bond and a reactive silicon group with (meth)acrylic acid ester.
(II) A method of copolymerizing (meth)acrylic acid ester in the presence of the aforementioned compound having a reactive silicon group and a mercapto group as a chain transfer agent.
(III) A method of copolymerizing a compound containing a polymerizable unsaturated bond and a reactive functional group (Z group) (for example, acrylic acid or 2-hydroxyethyl acrylate) with (meth)acrylic acid ester having no Z group, followed by reaction with a compound having a reactive silicon group and a functional group which can react with the Z group (for example, isocyanate silane compound).
(IV) A method of polymerizing (meth)acrylic acid ester by a living radical polymerization method and then introducing a reactive silicon group into the molecular chain terminal.

These methods may be used in any combination. From the viewpoint that a reactive silicon group can be introduced into both the molecular chain terminal and side chain, a combination of the above methods (I) and (II) is preferably used. Furthermore, the method (IV) is preferred in that a polymer having any molecular weight, a narrow molecular weight distribution, and a low viscosity can be obtained by the method.

Examples of the compound having a reactive silicon group and a mercapto group include 3-mercaptopropyltrimethoxysilane, 3-mercaptopropyldimethoxymethylsilane, mercaptomethyltrimethoxysilane, mercaptomethyldimethoxymethylsilane, and 3-mercaptopropyltriethoxysilane, mercaptomethyltriethoxysilane. Examples of the compound having a polymerizable unsaturated bond a reactive silicon group and a mercapto group include a compound having a (meth)acryloxy group and a reactive silicon group such as 3-(meth)acryloxypropyltrimethoxysilane, 3-(meth)acryloxypropyltriethoxysilane, (meth)acryloxymethyltrimethoxysilane, (meth)acryloxymethyldimethoxymethylsilane, 3-(meth)acryloxypropyldimethoxymethylsilane, or (meth)acryloxymethyldimethoxymethylsilane; and a compound having a vinyl group and a reactive silicon group such as vinyltrimethoxysilane or vinyltriethoxysilane. They may be used either singly or in combinations of two or more types thereof.

In the polymer (A), the reactive silicon group can be introduced to any one of the molecular chain terminal and side chain. From the viewpoint of the adhesiveness, it is preferable that the silicon group is introduced to both of the molecular chain terminal and side chain. Number of the reactive silicon group in one molecule of the polymer (A) is, on average, preferably 0.5 or more, more preferably 1.0 or more, and even more preferably 1.5 or more, and preferably 8.0 or less, more preferably 7.0 or less, and even more preferably 6.0 or less. The molecular weight of the polymer (A) is not particularly limited. To obtain a cured product with even higher strength, it is preferable to have higher molecular weight of the polymer (A). The number average molecular weight is preferably 2,000 or more, more preferably 3,000 or more, and even more preferably 4,000 or more, and preferably 100,000 or less, more preferably 50,000 or less, and even more preferably 30,000 or less, as determined by GPC calibrated with polystyrene standards.

The molecular weight distribution (weight average molecular weight (Mw)/number average molecular weight (Mn)) of the polymer (A) is, although not particularly limited, more preferably less than 4.0, and particularly preferably 3.0 or less.

In a case in which the polymer (A) is used after being mixed with the polymer (B), from the viewpoint of the compatibility with the polymer (B), the amount of the constitutional unit derived from alkyl (meth)acrylate of the polymer (A) is preferably 50% by weight or more, more preferably 70% by weight or more, and 98% preferably by weight or less, more preferably 95% by weight or less in the entire constitutional units.

To enhance the compatibility with the polymer (B), the monomer constituting the polymer (A) preferably contains alkyl (meth)acrylate in which the alkyl has carbon atom number of 1 to 6 (hereinbelow, also referred to as "monomer (c)") and alkyl (meth)acrylate in which the alkyl has carbon atom number of 7 to 30 (hereinbelow, also referred to as "monomer (d)"). Namely, the polymer (A) preferably contains a constitutional unit derived from the monomer (c) (hereinbelow, also referred to as "constitutional unit (c)") and a constitutional unit derived from the monomer (d) (hereinbelow, also referred to as "constitutional unit (d)"). The total amount of the monomer (c) and the monomer (d) in the entire monomers constituting the polymer (A) (that is, total amount of the monomer (c) and the monomer (d) in the entire constitutional units of the polymer (A)) is preferably 50 to 95% by weight, and more preferably 60 to 90% by weight. The weight ratio between the monomer (c) and the monomer (d) (the monomer (c):the monomer (d)), that is, the weight ratio between the constitutional unit (c) and the constitutional unit (a2) (the constitutional unit (c):the constitutional unit (d)), is preferably 95:5 to 40:60, and more preferably 90:10 to 60:40.

<Polymer (B)>

It is preferable that the curable composition also contains an oxyalkylene the polymer (B) together with the polymer (A).

The oxyalkylene polymer (B) has a reactive silicon group represented by the general formula (1), which has been indicated as the (meth)acrylic acid ester polymer (A).

The reactive silicon group represented by the general formula (1) can be a single type or two or more types thereof. The reactive silicon group represented by the general formula (1) is preferably a single type, and more preferably it is a trimethoxysilyl group, a triethoxysilyl group, a tris(2-propenyl oxy)silyl group, a triacetoxysilyl group, a dimethoxymethylsilyl group, a diethoxymethylsilyl group, a diisopropoxymethylsilyl group, a (chloromethyl) dimethoxysilyl group, a (methoxymethyl)dimethoxysilyl group, a (methoxymethyl)diethoxysilyl group, or an (ethoxy methyl)dimethoxysilyl group, it is preferably a dimethoxymethylsilyl group or a trimethoxysilyl group, and more preferably a dimethoxymethylsilyl group. From the viewpoint of obtaining easily a cured product with high adhesive strength, the reactive silicon group represented by the general formula (1) in the polymer (B) is a group in which a is 1. From this point of view, the reactive silicon group is preferably a dimethoxymethylsilyl group, a diethoxymethylsilyl group, a diisopropoxymethylsilyl group, a (chloromethyl)dimethoxysilyl group, a (methoxymethyl)dimethoxysilyl group, a (methoxymethyl)diethoxysilyl group, or an (ethoxymethyl)dimethoxysilyl group, more preferably a dimethoxymethylsilyl group, a diethoxymethylsilyl group, or a diisopropoxymethylsilyl group, and particularly preferably a dimethoxymethylsilyl group.

Examples of the main chain of the oxyalkylene polymer (B) (that is, polyoxyalkylene part not having a reactive silicon group) include polyoxyethylene, polyoxypropylene, polyoxybutylene, polyoxytetramethylene, polyoxyethylenepolyoxypropylene copolymer, and polyoxypropylene-polyoxybutylene copolymer. The main chain of the oxyalkylene polymer (B) may be formed of a single type of a constitutional unit or two or more types of a constitutional unit. When the curable composition according to one or more embodiments of the present invention is used for a sealant, an adhesive, or the like, in particular, it is preferable to use the oxypropylene polymer (B) which contains, in the entire constitutional units, 50% by weight or more, and preferably 80% by weight or more of the oxypropylene constitutional unit. Such oxypropylene polymer (B) is amorphous and also has relatively low viscosity.

The polymer (B) may be a linear chain or a branch chain. From the viewpoint of obtaining a cured product with high elongation, the polymer (A) is preferably a linear chain. In a case in which the polymer (A) is a branch chain, number of the branch chain is preferably 1 to 4, and more preferably 1.

The polyoxyalkylene not containing a reactive silicon group can be produced by ring-opening polymerization reaction of a cyclic ether compound using a polymerization catalyst in the presence of an initiator. Examples of the cyclic ether compound include ethylene oxide, propylene oxide, butylene oxide, tetramethylene oxide, and tetrahydrofuran. These cyclic ether compounds may be used either singly or in combinations of two or more types thereof. Among these cyclic ether compounds, propylene oxide is preferred because polyoxyalkylene that is amorphous and has a relatively low viscosity can be obtained.

Examples of the initiator include alcohols such as ethylene glycol, propylene glycol, butane diol, hexamethylene glycol, neopentyl glycol, diethylene glycol, dipropylene glycol, triethylene glycol, glycerin, trimethylolmethane, trimethylolpropane, pentaerythritol, or sorbitol; and hydroxyl group-containing polyoxyalkylene having a number average molecular weight of 300 to 4,000 such as polyoxypropylene diol, polyoxypropylene triol, polyoxyethylene diol, or polyoxyethylene triol.

Method for synthesizing the polyoxyalkylene not containing a reactive silicon group is not particularly limited. Examples of the method for synthesis include a polymerization method using an alkali catalyst such as KOH; a polymerization method using a transition metal compound-porphyrin complex catalyst such as a complex obtained by reacting an organoaluminum compound with porphyrin, as disclosed in Japanese Unexamined Patent Application, Publication No. S61-215623; a polymerization method using a composite metal cyanide complex catalyst, as disclosed in, for example, Japanese Examined Patent Application, Publication No. S46-27250, Japanese Examined Patent Application, Publication No. S59-15336, and U.S. Pat. Nos. 3,278,457, 3,278,458, 3,278,459, 3,427,256, 3,427,334, and 3,427,335; a polymerization method using a catalyst containing a polyphosphagen salt, as described in Japanese Unexamined Patent Application, Publication No. H10-273512; and a polymerization method using a catalyst consisting of a phosphagen compound, as described in Japanese Unexamined Patent Application, Publication No. H11-060722. The polymerization method using a composite metal cyanide complex catalyst is preferred due to the reasons like production costs and obtainment of polymers having a narrow molecular weight distribution (for example, zinc hexacyanocobaltate glyme complex catalyst).

The method for introducing a reactive silicon group to polyoxyalkylene is not particularly limited, and a known method can be used. As a method for introducing a reactive silicon group, the following methods (i) and (ii) can be mentioned, for example.

(i) Hydrosilylation

Exemplified is a method in which an unsaturated bond is introduced to polyoxyalkylene as a raw material (hereinbelow, also referred to as a "precursor polymer") and a hydrosilane compound is added to the unsaturated bond by a hydrosilylation reaction. The method for introducing an unsaturated bond is not particularly limited, and examples of the method include a method in which a precursor polymer having a functional group like hydroxyl group is reacted with a compound which has a group for forming a bond with the functional group and an unsaturated bond to obtain a polymer containing an unsaturated bond; and a method of polymerizing a monomer having an unsaturated bond.

Examples of the hydrosilane compound that can be used for the above method (i) include halogenated silanes such as trichloro silane, dichloro methylsilane, dichlorophenylsilane, or (methoxymethyl)dichlorosilane; alkoxysilanes such as dimethoxymethylsilane, diethoxymethylsilane, trimethoxysilane, triethoxysilane, (chloromethyl)dimethoxysilane, or (methoxymethyl)dimethoxysilane; and isopropenyloxysilanes such as triisopropenyloxysilane, (chloromethyl)diisopropenyloxysilane, or (methoxymethyl)diisopropenyloxysilane.

(ii) Reaction Between Reactive Group-Containing Polymer (Precursor Polymer) and Silane Coupling Agent There is a method in which a precursor polymer having a functional group such as hydroxyl group, amino group, or unsaturated bond is reacted with a compound having both a group which reacts with the functional group to form a bond (hereinbelow, also referred to as a "reactive group") and a reactive silicon group (silane coupling agent). Examples of the combination of the functional group of a precursor polymer and the reactive group of a silane coupling agent include a combination of hydroxyl group and isocyanate group, a combination of hydroxyl group and epoxy group, a combination of amino group and isocyanate group, a combination of amino group and thioisocyanate group, a combination of amino group and epoxy group, a combination of amino group and α,β-unsaturated vinyl group (reaction based on Michael addition), a combination of carboxy group and epoxy group, and a combination of unsaturated bond and mercapto group, but it is not limited thereto.

Examples of the silane coupling agent which may be used for the above method (ii) include mercaptosilanes which can have a reaction with an unsaturated bond such as 3-mercaptopropyltrimethoxysilane, 3-mercaptopropyldimethoxymethylsilane, 3-mercaptopropyltriethoxysilane, mercaptomethyltriethoxysilane, or mercaptomethyldimethoxymethylsilane; isocyanate silanes which can have a reaction with a hydroxyl group such as 3-isocyanate propyltrimethoxysilane, 3-isocyanate propyldimethoxymethylsilane, 3-isocyanate propyltriethoxysilane, isocyanate methyltrimethoxysilane, isocyanate methyltriethoxysilane, or isocyanate methyldimethoxymethylsilane; epoxysilanes which can have a reaction with a hydroxyl group, an amino group or a carboxy group such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, or glycidoxymethyldimethoxymethylsilane; aminosilanes which can have a reaction with an isocyanate group or a thioisocyanate group such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexyl aminomethyl triethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, or bis(3-(trimethoxysilyl)propyl)amine; and hydroxyalkylsilanes such as 3-hydroxypropyltrimethoxysilane or hydroxymethyltriethoxysilane.

The above method (i) has advantages that the reaction is simple, the introduction amount of a reactive silicon group can be controlled, and the physical properties of a reactive silicon group-containing polymer (B) to be obtained are stable. The above method (ii) has advantages that there are many options available for the reaction and the introduction ratio of the reactive silicon group can be easily increased. Furthermore, it is also possible that the reactive silicon group can be introduced to polyoxyalkylene according to a known method other than (i) and (ii) that are described above.

The main chain of the polymer (B) may contain an ester bond or an amide segment represented by the general formula (3) as long as the effect according to one or more embodiments of the present invention is not impaired:

(in the formula, $R^2$ represents an organic group with 1 to 10 carbon atoms or a hydrogen atom).

The cured product obtained from a curable composition containing the polymer (B) which has an ester bond or amide segment may have high hardness or high strength due to the action of a hydrogen bond or the like. However, the polymer (B) containing an amide segment may experience a chain breakage caused by heat or the like. Furthermore, a curable composition which has the polymer (B) containing an amide segment or the like has a tendency of having high viscosity. Considering the merits and demerits that are described above, it is possible to use, as the polymer (B), polyoxyalkylene containing an amide segment or the like, or polyoxyalkylene not containing an amide segment or the like. Examples of the amide segment represented by the general formula (3) include one formed by a reaction of isocyanate group and hydroxyl group, one formed by a reaction of amino group and carbonate group, one formed by a reaction of isocyanate group and amino group, one formed by a reaction of isocyanate group and mercapto group and the like. In addition, a segment formed by a reaction of the aforementioned amide segment containing an active hydrogen atom and isocyanate group is also included in the amide segment represented by the general formula (3).

As a method for producing the polymer (B) containing an amide segment, for example, there is a method including reacting an excess polyisocyanate compound with polyoxyalkylene having an active hydrogen-containing group on the terminal to synthesize a polymer having an isocyanate group on the terminal, and then or simultaneously, reacting the whole or a part of the isocyanate group of the synthesized polymer with Z group of a silicon compound that is represented by the general formula (4):

(in the formula, $R^1$, X and a are as defined above. $R^3$ is a divalent organic group, more preferably a divalent hydrocarbon group with carbon atom number of 1 to 20, and Z is a hydroxyl group, a carboxy group, a mercapto group, a primary amino group, or a secondary amino group).

The silicon compound represented by the general formula (4) is not particularly limited, and examples thereof include amino group-containing silanes such as γ-aminopropyldimethoxymethylsilane, γ-aminopropyltrimethoxysilane, N-(β-aminoethyl)-γ-aminopropyltrimethoxysilane, N-(β-aminoethyl)-γ-aminopropyldimethoxymethylsilane, (N-phenyl)-γ-aminopropyltrimethoxysilane, or N-ethylaminoisobutyltrimethoxysilane; hydroxyl group-containing silanes such as γ-hydroxypropyltrimethoxysilane; and mercapto group-containing silanes such as γ-mercaptopropyltrimethoxysilane or mercaptomethyltriethoxysilane. As disclosed in Japanese Unexamined Patent Application, Publication No. H6-211879 (U.S. Pat. No. 5,364,955), Japanese Unexamined Patent Application, Publication No. H10-53637 (U.S. Pat. No. 5,756,751), Japanese Unexamined Patent Application, Publication No. H10-204144 (EP 0831108), Japanese Unexamined Patent Application, Publication No. 2000-169544, and Japanese Unexamined Patent Application, Publication No. 2000-169545, the Michael addition reaction product between various α,β-unsaturated carbonyl compounds and a primary amino group-containing silane and also the Michael addition reaction product between various (meth)acryloyl group-containing silanes and a primary amino group-containing compound can be also used as the silicon compound represented by the general formula (4).

Furthermore, as a method for producing the polymer (B) containing an amide segment, a method in which polyoxyalkylene having an active hydrogen-containing group at the terminal is reacted with a reactive silicon group-containing isocyanate compound represented by the general formula (5) can be mentioned:

(in the formula, $R^3$, $R^1$, X, and a are as defined above).

The reactive silicon group-containing isocyanate compound represented by the general formula (5) is not particularly limited, and examples thereof include γ-trimethoxysilylpropylisocyanate, γ-triethoxysilylpropylisocyanate, γ-methyldimethoxysilylpropylisocyanate, γ-methyldiethoxysilylpropylisocyanate, γ-(methoxymethyl)dimethoxysilylpropylisocyanate, γ-trimethoxysilylmethylisocyanate, triethoxymethylsilylmethylisocyanate, dimethoxymethylsilylmethylisocyanate, diethoxymethylsilylmethylisocyanate, and (methoxymethyl)dimethoxysilylmethylisocyanate.

When the polymer (B) contains an amide segment, number (mean value) of the amide segment per molecule of the polymer (B) is preferably 1 to 10, more preferably 1.5 to 5, and particularly preferably 2 to 3. When the number is lower than 1, there is a case in which the curing property is insufficient, and, on the other hand, when it is higher than 10, the polymer (B) has high viscosity, thus yielding a possibility of difficult handling. In order to lower the viscosity and improve the workability of a curable composition, it is preferable that the polymer (B) does not contain an amide segment.

The polymer (B) has, on average per molecule, preferably 1.2 or more, more preferably 1.3 or more, and even more preferably 1.5 or more of the reactive silicon group that is represented by the general formula (2). The upper limit of the number of reactive silicon group per molecule of the polymer (B) (average value) is preferably 6.0, more preferably 5.5, and even more preferably 5.0. If the number of the reactive silicon group is 1 or less, there is a possibility that a cured product with high strength may not be obtained, and, on the other hand, if the number of the reactive silicon group is more than 6.0, there is a possibility that a cured product with high elongation may not be obtained.

The number of the reactive silicon group per molecule of the polymer (B) (average value) is defined as a value which is measured and calculated from protons on a carbon to which the reactive silicon group is directly bonded by high performance $^1$H-NMR method. With regard to the measurement and calculation of the number of the reactive silicon group, a precursor polymer not introduced with a reactive silicon group and a polymer not introduced with a reactive silicon group obtained by a side reaction during the introduction of a reactive silicon group to a precursor polymer are also taken as part of the polymer (B), and they are included in the mother number (number of molecules of the polymer (B)) for calculating the number of reactive silicon group (average value).

It is possible that the polymer (B) has, on average, more than one reactive silicon group at one terminal site.

Examples of a method for producing the polymer (B) which has, on average, more than one reactive silicon group at one terminal site include the following method:

(a) polyoxyalkylene having a hydroxyl group at the terminal (precursor polymer) is reacted with an epoxy compound having an unsaturated bond, and an unsaturated bond and an hydroxyl group are introduced to the terminal of the precursor polymer, (b) a compound having a group which can form a bond according to a reaction with a hydroxyl group (for example, halogen atom) and an unsaturated bond is reacted with the polymer obtained from the above, and a plurality of unsaturated bond are introduced to the terminal of the polymer, and (c) a hydrosilane compound is added to a plurality of unsaturated bond by a hydrosilylation reaction.

Examples of the epoxy compound which is used for the above reaction (a) include (meth)allyl glycidyl ether, glycidyl(meth)acrylate, butadiene monooxide, and 1,4-cyclopentadiene monoepoxide. From the viewpoint of the reactivity, allyl glycidyl ether is preferable. Furthermore, in the claims and detailed description of the embodiments, the term "(meth)allyl" indicates "allyl and/or methallyl", and the term "(meth)acrylate" indicates "acrylate and/or methacrylate".

The use amount of the epoxy compound in the above reaction (a) can be suitably set by considering the amount of an unsaturated bond to be introduced to polyoxyalkylene having a hydroxyl group at the terminal (precursor polymer) or the reactivity. The use amount is, relative to a 1 mol of the hydroxyl group in polyoxyalkylene, preferably 0.2 mol or more, more preferably 0.5 mol or more, and preferably 5.0 mol or less, more preferably 2.0 mol or less.

The reaction temperature of the above reaction (a) is preferably 60° C. or higher and 150° C. or lower, and more preferably 110° C. or higher and 140° C. or lower. When the reaction temperature is low, there is a possibility that the reaction hardly progresses, and when the reaction temperature is excessively high, there is a possibility that the polyoxyalkylene main chain dissociates.

Examples of the compound which is used in above reaction (b) and has a group for forming a bond with hydroxyl group and an unsaturated bond include 3-chloro-1-propene and 3-chloro-2-methyl-1-propene. The use amount of the compound in the above reaction (b) is, relative to a 1 mol of the hydroxyl group in the polymer, preferably 1.1 mol or more, more preferably 1.2 mol or more, and preferably 1.4 mol or less. The polymer terminal obtained by the above reaction (b) is represented by the general formula (6):

[Formula 1]

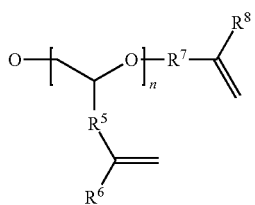

(6)

(in the formula, $R^5$ and $R^7$ each independently represent a divalent organic group with 1 to 10 carbon atoms which may contain an oxygen atom or a nitrogen atom. $R^6$ and $R^8$ each independently represent a hydrogen atom or a hydrocarbon group with 1 to 10 carbon atoms. n represents an integer of 1 to 10).

As for the hydrosilane compound which is used for the above reaction (c), the compounds exemplified for the above method (i) can be mentioned. The use amount of the hydrosilane compound for the reaction (c) is, relative to a 1 mol of the unsaturated bond in the above polymer, preferably 0.65 mol or more, more preferably 0.75 mol or more, and preferably 1.1 mol or less, more preferably 1.2 mol or less.

The reactive silicon group of the polymer (B) is, on average at one terminal site, preferably 0.5 or more, more preferably 1.0 or more, even more preferably 1.1 or more, and most preferably 1.5 or more.

The number average molecular weight of the polymer (B) is preferably 8,000 or more, more preferably 9,000 or more, even more preferably 10,000 or more, particularly preferably 15,000 or more, and most preferably 20,000 or more, and it is also preferably 50,000 or less, more preferably 35,000 or less, and even more preferably 30,000 or less. When the number average molecular weight of the polymer (B) is low, the viscosity is low, and thus the workability is good during the use of a curable composition, but, as a hard cured product is obtained, there is a tendency of having lower elongation. On the other hand, when the number average molecular weight of the polymer (B) is excessively high, concentration of the reactive silicon group becomes excessively low, and thus there is a possibility that slower curing rate is yielded, and furthermore, as the viscosity increases excessively, there is a tendency of having difficult handling.

The molecular weight distribution (weight average molecular weight (Mw)/number average molecular weight (Mn)) of the polymer (B) is not particularly limited. The molecular weight distribution is preferably narrow, and it is more preferably less than 2.0, even more preferably 1.6 or less, particularly preferably 1.5 or less, and most preferably 1.4 or less.

The weight ratio between the polymer (A) and the polymer (B) for a case in which the polymer (B) is contained is not particularly limited. The polymer (B):the polymer (A) is preferably 95:5 to 30:70, more preferably 85:15 to 40:60, and even more preferably 80:20 to 50:50. Total content of the polymer (A) and the polymer (B) in a curable composition is preferably 10 to 90% by weight, and more preferably 30 to 80% by weight.

<Other Components>

As long as the effect according to one or more embodiments of the present invention is not inhibited, the curable composition may contain a component other than the polymer (A) and the polymer (B) that are described above (other components). Hereinbelow, explanations are given for the other components.

In one or more embodiments of the present invention, a curing catalyst is used for the purpose of curing the polymer (A) and the polymer (B). Specific examples of the curing catalyst include titan compounds such as tetrabutyl titanate, tetrapropyl titanate, titan tetrakis(acetylacetonate), bis(acetylacetonate)diisopropoxy titan, or diisopropoxy titan bis(ethylacetoacetate; tetravalent organic tin compounds such as dimethyl tin diacetate, dimethyl tin bis(acetylacetonate), dibutyl tin dilaurate, dibutyl tin maleate, dibutyl tin phthalate, dibutyl tin dioctanoate, dibutyl tin bis(2-ethylhexanoate), dibutyl tin bis(methylmaleate), dibutyl tin bis(ethylmaleate), dibutyl tin bis(butylmaleate), dibutyl tin bis(octylmaleate), dibutyl tin bis(tridecylmaleate), dibutyl tin bis(benzylmaleate), dibutyl tin diacetate, dioctyl tin bis(triethoxysilicate), dioctyl tin bis(ethylmaleate), dioctyl tin bis(octylmaleate), dibutyl tin dimethoxide, dibutyl tin bis(nonylphenoxide), dibutenyl tin oxide, dibutyl tin oxide, dibutyl tin bis(acetylacetonate), dibutyl tin bis(ethylacetoacetonate), reaction product of dibutyl tin oxide and silicate compound, reaction product of dibutyl tin oxide and phthalic acid ester, dioctyl tin dilaurate, dioctyl tin diacetate, or dioctyl tin bis(acetylacetonate); organic aluminum compounds such as aluminum tris(acetylacetonate), aluminum tris(ethylacetoacetate), or diisopropoxy aluminum ethylacetoacetate; zirconium compounds such as zirconium tetrakis (acetylacetonate); carboxylic acids such as 2-ethylhexanoic acid, octyl acid, neodecanoic acid, oleic acid, or naphthenic acid; metal salts of carboxylic acid such as tin carboxylate, lead carboxylate, bismuth carboxylate, potassium carboxylate, calcium carboxylate, barium carboxylate, titan carboxylate, zirconium carboxylate, hafnium carboxylate, vanadium carboxylate, manganese carboxylate, iron carboxylate, cobalt carboxylate, nickel carboxylate, or cerium carboxylate; amidine compounds such as 1-(o-tolyl)biguanide, 1-phenylguanidine, 1,2-dimethyl-1,4,5,6-tetrahydropyrimidine, 1,5,7-triazabicyclo[4.4.0]deca-5-en, 7-methyl-1,5,7-triazabicyclo[4.4.0]deca-5-en, 1,8-diazabicyclo[5.4.0] undecene-7 (DBU), or 1,5-diazabicyclo[4.3.0]nonene-5 (DBN); boron trifluoride complexes such as boron trifluoride, boron trifluoride diethyl ether complex, or boron trifluoride ethylamine complex; and compounds containing fluoride anion such as ammonium fluoride, tetrabutyl ammonium fluoride, potassium fluoride, cesium fluoride, ammonium hydrogen fluoride, 1,1,2,3,3,3-hexafluoro-1-diethylaminopropane (MEC81, commonly referred to as Ishikawa reagent), potassium hexafluorophosphate, $Na_2SiF_6$, $K_2SiF_6$, or $(NH_4)_2SiF_6$. The curing catalyst is not limited to them.

Among them, from the viewpoint of obtaining a cured product which exhibits excellent strength and elongation, a dibutyl tin based compound, a dioctyl tin based compound, tin carboxylate, and carboxylic acid are preferable. From the viewpoint of having low toxicity, a dioctyl tin based compound, tin carboxylate, and carboxylic acid are more preferable.

The use amount of the curing catalyst is, relative to 100 parts by weight of the polymer (A) and the polymer (B), preferably 0.01 to 10 parts by weight or so, and more preferably 0.1 to 5 parts by weight. With regard to the tin based compound, there is a movement of limiting the use amount as issues related with an environment increase. As such, in case of using the tin based compound, it is preferably used at less than 1 part by weight.

A plasticizer may be added to the curable composition. According to the addition of a plasticizer, it is possible to control the viscosity and slump properties of the curable composition and the mechanical properties such as hardness, tensile strength, and elongation of a cured product obtained by curing the curable composition. Specific examples of the plasticizer include phthalic acid ester compounds such as dibutyl phthalate, diisononyl phthalate (DINP), diheptyl phthalate, di(2-ethylhexyl) phthalate, diisodecyl phthalate (DIDP), or butylbenzyl phthalate; terephthalic acid ester compounds such as bis(2-ethylhexyl)-1,4-benzene dicarboxylate (specifically, Eastman 168 (product name) available from Eastman Chemical Company); non-phthalic acid ester compounds such as 1,2-cyclohexane dicarboxylic acid diisononyl ester (specifically, Hexamoll DINCH (product name) available from BASF); aliphatic polycarboxylic acid ester compounds such as dioctyl adipate, dioctyl sebacate, dibutyl sebacate, diisodecyl succinate, and acetyl tributyl citrate; unsaturated fatty acid ester compounds such as butyl oleate or methyl acetyl ricinoleate; alkyl sulfonic acid phenyl esters (specifically, Mesamoll (product name) available from Lanxess); phosphoric acid ester compounds such as tricresyl phosphate or tributyl phosphate; trimellitate compounds; chlorinated paraffins; hydrocarbon oils such as alkyl diphenyl or partially hydrogenated terphenyl; process oil; and epoxy plasticizers such as epoxidized soybean oil and benzyl epoxystearate.

A high molecular weight plasticizer can be also used. With the use of the high molecular weight plasticizer, the initial physical properties can be maintained for a long time as compared to when a low molecular weight plasticizer which contains no polymer component in the molecule is used. In addition, the high molecular weight plasticizer can improve the drying properties (coating properties) of an alkyd paint applied to the cured product. When it is desired to obtain a cured product with high strength, it is preferable to use a high molecular weight plasticizer instead of a low molecular weight plasticizer. Specific examples of the high molecular weight plasticizer include (meth)acrylic acid ester polymers that are obtained by various methods; esters of polyalkylene glycols, such as diethylene glycol dibenzoate, triethylene glycol dibenzoate, or pentaerythritol esters; polyester plasticizers prepared from dibasic acids (for example, sebacic acid, adipic acid, azelaic acid, and phthalic acid) and divalent alcohols (for example, ethylene glycol, diethylene glycol, triethylene glycol, propylene glycol, and dipropylene glycol); polyether polyols such as polyether polyols having a number average molecular weight of 500 or more, or even 1,000 or more, such as polyethylene glycol, polypropylene glycol, or polytetramethylene glycol; or polyether in which the hydroxyl group of those polyether polyols is urethanized (for example, product name: LBU-25 (manufactured by Sanyo Kasei Ltd.)), polyether esterified with carboxylic acid, and polyether having etherified terminal: polystyrenes such as polystyrene and poly-α-methyl styrene; and polybutadiene, polybutene, polyisobutylene, butadiene-acrylonitrile, and polychloroprene. The high molecular weight plasticizer is not limited to them.

As for the high molecular weight plasticizer, those compatible with the polymer (A) and the polymer (B) are preferable. From this point of view, a polyether based polymer or a (meth)acrylic acid ester polymer is preferable. Use of a polyether based polymer as a plasticizer is desirable in that the surface curing property and deep part curing property are improved and delayed curing after storage does not occur, and among the plasticizers, polypropylene glycol is more preferable. From the viewpoint of suppressing a decrease in strength caused by addition of a plasticizer, it is preferable to use a polyether based polymer which does not have a hydroxyl group at the terminal. From the viewpoint of causing hardly any decrease in the adhesion strength, a (meth)acrylic acid ester polymer is preferable. Among the (meth)acrylic acid ester polymers, polyalkyl (meth)acrylic acid ester polymer is particularly preferable. The synthesis method of this polymer is preferably the living radical polymerization method, more preferably the atom transfer radical polymerization, since a polymer having low molecular weight distribution and low viscosity can be easily obtained. In addition, a polymer obtained by continuous bulk polymerization of the alkyl (meth)acrylic acid ester monomer at a high temperature and high pressure as described in Japanese Unexamined Patent Application, Publication No. 2001-207157 (obtained by SGO process) is preferably used.

The number average molecular weight of the high molecular weight plasticizer is preferably 500 to 15,000, more preferably 800 to 10,000, even more preferably 1,000 to 8,000, and most preferably 1,000 to 5,000, as determined by GPC calibrated with polystyrene standards. It is most preferably 1,000 to 3,000. If the molecular weight is excessively low, the plasticizer leaks over time as caused by heat or rain, and thus it is difficult to maintain the initial physical properties for a long period of time. On the other hand, if the molecular weight is excessively high, the viscosity is increased so that poor workability may be yielded.

The molecular weight distribution of the high molecular weight plasticizer is not particularly limited, but the molecular weight distribution is preferably narrow, and it is more preferably less than 1.80. It is even more preferably 1.70 or less, still even more preferably 1.60 or less, still even more preferably 1.50 or less, particularly preferably 1.40 or less, and most preferably 1.30 or less.

A high molecular weight plasticizer having a reactive silicon group can be used. As for the reactive silicon group, the silicon group represented by the general formula (1) can be mentioned. The reactive silicon group can be introduced by the method exemplified in relation to the polymer (A) or the polymer (B). With regard to the number of the reactive silicon group, the lower limit is preferably 0.3 or more, more preferably 0.5 or more, and particularly preferably 0.6 or more, on average per molecule. The upper limit is preferably 1.3 or less. When the number of the reactive silicon group is 0.3 or less, there is a possibility that a cured product with high strength may not be obtained, and therefore undesirable. On the other hand, when the number of the reactive silicon group is more than 1.3, there is a possibility that a cured product with high elongation may not be obtained, and therefore undesirable.

The use amount of the plasticizer is, relative to 100 parts by weight of the total weight of the polymer (A) and the polymer (B), preferably 5 to 150 parts by weight, more preferably 10 to 120 parts by weight, and particularly preferably 20 to 100 parts by weight. When it is less than 5 parts by weight, the effect as a plasticizer is not likely to be exhibited, and when it is more than 150 parts by weight, there is a case in which the mechanical strength of the cured product is insufficient. The plasticizer may be used either singly or in combination of two or more types thereof. It is also possible to use in combination a low molecular weight plasticizer and a high molecular weight plasticizer. Those plasticizers can be also blended during the production of a polymer. When it is desired that the curable composition according to one or more embodiments of the present invention exhibits high strength, it is preferable that the plasticizer is not used.

To the curable composition, a solvent or a diluent may be added. The solvent and diluent are not particularly limited, but aliphatic hydrocarbons, aromatic hydrocarbons, alicyclic hydrocarbons, halogenated hydrocarbons, alcohols, ester, ketones, ethers, or the like can be used. When a solvent or a diluent is used, in view of the air contamination problem when the composition is used inside, the boiling point of the solvent is preferably not less than 150° C., more preferably not less than 200° C., and particularly preferably not less than 250° C. The solvent or diluent may be used either singly or in combination of two or more types thereof.

The curable composition may be added with, as an adhesiveness imparting agent, a silane coupling agent, a reaction product of a silane coupling agent, or a compound other than silane coupling agents. Specific examples of the silane coupling agent include isocyanate group-containing silanes such as γ-isocyanate propyltrimethoxysilane, γ-isocyanate propyltriethoxysilane, γ-isocyanate propylmethyldiethoxysilane, γ-isocyanate propylmethyldimethoxysilane, α-isocyanate methyltrimethoxysilane, or α-isocyanate methyldimethoxymethylsilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, (aminomethyl)dimethoxymethylsilane, (aminomethyl)trimethoxysilane, (phenylaminomethyl)dimethoxymethylsilane, (phenylaminomethyl)trimethoxysilane, or bis(3-trimethoxysilylpropyl)amine; mercapto group-containing silanes such as γ-mercaptopropyltrimethoxysilane, γ-mercaptopropyltriethoxysilane, γ-mercaptopropylmethyldimethoxysilane, or γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, or β-(3,4-epoxycyclohexyl)ethyltriethoxysilane; carboxysilanes such as β-carboxyethyltriethoxysilane, β-carboxyethylphenylbis(β-methoxyethoxy)silane, or N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, or γ-acryloyloxypropylmethyltriethoxysilane; halogen-containing silanes such as γ-chloropropyltrimethoxysilane; isocyanuratesilanes such as tris(trimethoxysilyl)isocyanurate; carbamate silanes such as methyl (N-dimethoxymethylsilylmethyl)carbamate, methyl (N-trimethoxysilylmethyl)carbamate, methyl (N-dimethoxymethylsilylpropyl)carbamate, or methyl (N-trimethoxysilylpropyl)carbamate; alkoxy group-containing silanes such as (methoxymethyl)dimethoxymethylsilane, (methoxymethyl)trimethoxysilane, (ethoxymethyl)trimethoxysilane, or (phenoxymethyl)trimethoxysilane; and silanes containing acid anhydride such as 3-(trimethoxysilyl)propyl succinic anhydride or 3-(triethoxysilyl)propyl succinic anhydride. Partial condensate of those compounds, and amino-modified silyl polymers, silylated amino polymers, unsaturated aminosilane complexes, phenylamino long-chain alkyl silanes, aminosilylated silicones, and silylated polyesters, which are the derivatives obtained by modifying the above compounds, can be also used as a silane coupling agent. Those silane coupling agents may be used either singly or in combination thereof. Examples of the reaction product of a silane coupling agent also include a reaction product between isocyanate silane and a compound containing hydroxyl group, a compound containing amino group; a Michael addition reaction product of aminosilane; a reaction product between aminosilane and a compound containing epoxy group, a reaction product between epoxysilane and a compound containing carboxylic acid, a compound containing amino group.

The use amount of the silane coupling agent is, relative to 100 parts by weight of the total weight of the polymer (A) and the polymer (B), preferably 0.1 to 20 parts by weight, and particularly preferably 0.5 to 10 parts by weight.

Specific examples of the adhesiveness imparting agent other than the silane coupling agent include, although not particularly limited, epoxy resin, phenol resin, sulfur, alkyl titanates, and aromatic polyisocyanate. The adhesiveness imparting agent may be used either singly or two or more types of them may be used as a mixture. By adding those adhesiveness imparting agents, adhesiveness to an adherend can be improved.

In addition, the composition according to one or more embodiments of the present invention may be added with silicate. The silicate acts as a crosslinking agent and has a function to improve recovery property, durability, and creep resistance of a cured product which is obtained from the curable composition. Furthermore, silicate also has an effect to improve the adhesiveness and water-resistant adhesiveness, as well as adhesion durability under high temperature and high humidity conditions. As silicate, tetraalkoxysilane and alkylalkoxysilane, or a partially hydrolyzed condensate thereof can be used.

Specific examples of the silicate include tetraalkoxysilane (tetraalkylsilicate) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, or tetra-t-butoxysilane, and a partially hydrolyzed condensate thereof.

The partially hydrolyzed condensate of tetraalkoxysilane is preferred because the effect of improving recovery property, durability, and creep resistance is higher than that of tetraalkoxysilane.

Examples of the partially hydrolyzed condensate of tetraalkoxysilane include a condensate which is obtained by adding water to tetraalkoxysilane followed by partial hydrolysis and condensation according to a common method. As for the partially hydrolyzed condensate of an organosilicate compound like tetraalkoxysilane, a commercially available product can be used. Examples of the condensate include methyl silicate 51 and ethyl silicate 40 (both manufactured by Colcoat Co., Ltd.).

In case of using the silicate, use amount thereof is, relative to 100 parts by weight of the total weight of the polymer (A) and the polymer (B), preferably 0.1 to 20 parts by weight, and particularly preferably 0.5 to 10 parts by weight.

The curable composition according to one or more embodiments of the present invention can be blended with various fillers. Examples of the filler include fumed silica, precipitated silica, crystal silica, molten silica, dolomite, silicic anhydride, hydrous silicate, aluminum hydroxide, carbon black, hollow alumina silica fine particles (for example, product name: PANSIL UltraSpheres (manufactured by TOLSA)), heavy calcium carbonate, colloidal calcium carbonate, magnesium carbonate, diatomite, sintered clay, clay, talc, kaolinite, sillitin, titanium oxide, bentonite, organic bentonite, ferric oxide, aluminum fine powder, flint powder, zinc oxide, activated zinc oxide, resin powder such as PVC powder, PMMA1 powder and the like, fiber filler such as asbestos, glass fiber, and filament.

The filler can be dried in advance by dehydration including, as described in Japanese Unexamined Patent Application, Publication No. 2001-181532, uniformly mixing the filler with a dehydrating agent such as oxidation calcium and the like, sealing the mixture in a bag made of an air-tight material, and leaving the bag for a suitable time period. Using this low water content filler, the storage stability can be improved in case of having a one-liquid type composition, in particular.

In addition, when a highly transparent composition is to be obtained, a polymer powder made from a polymer such as methyl methacrylate and the like as a starting material, amorphous silica and the like can be used as a filler, as described in Japanese Unexamined Patent Application, Publication No. H11-302527. Furthermore, as described in Japanese Unexamined Patent Application, Publication No. 2000-38560, using hydrophobic silica which is a silicon dioxide fine powder having a hydrophobic group bonded on its surface and the like as a filler, a highly transparent composition can be obtained. On a surface of silicon dioxide fine powder, a silanol group (—SiOH) is generally present. Hydrophobic silica has, on the surface, a hydrophobized silyl group (—SiO— hydrophobic group) which is generated by a reaction between a silanol group and an organic silicon halide, alcohols, or the like. For producing hydrophobic silica, specifically, the silanol group present on the surface of silicon dioxide fine powder is reacted with dimethylsiloxane, hexamethyldisilazane, dimethyldichlorosilane, trimethoxyoctylsilane, trimethylsilane and the like to form a bond. Furthermore, the silicon dioxide fine powder having a many silanol groups (—SiOH) on the surface is called hydrophilic silica fine powder.

When a cured product with a highly adhesive strength is desired by using these fillers, a filler selected from fumed silica, precipitated silica, crystal silica, molten silica, dolomite, silicic anhydride, hydrous silicate, carbon black, aluminum hydroxide, colloidal calcium carbonate, heavy calcium carbonate, sintered clay, clay, titanium oxide, silica-alumina ceramic filler, kaolinite, sillitin, activated zinc oxide and the like is preferable. The use amount of the filler is preferably 1 to 200 parts by weight per 100 parts by weight of the total weight of polymer (A) and the polymer (B). In general, calcium carbonate having a greater specific surface area shows greater improving effect on the tensile strength at break, elongation at break and adhesiveness of the cured product. Therefore, the average primary particle size of heavy calcium carbonate is preferably less than 3 μm, more preferably less than 2 μm, and most preferably less than 1 μm. The lower limit of the average primary particle size is preferably 0.05 μm. When calcium carbonate is used, each of surface-treated calcium carbonate and non-surface-treated calcium carbonate may be used singly, or used in combination. When an increase in the dispersibility of calcium carbonate is desired, a surface-treated calcium carbonate is preferably applied, and when a cured product having high strength is desired, calcium carbonate with no surface treatment or a low level of a surface treatment is preferable. Examples of the surface treating agent for producing surface-treated calcium carbonate powder include carboxylic acid and ester thereof such as fatty acid or unsaturated fatty acid represented by palmitic acid, caprylic acid, capric acid, lauric acid, stearic acid, arachidic acid, behenic acid, lignoceric acid, oleic acid, linoleic acid, linolenic acid and the like, and rosin acid-based compound and the like, silane compounds such as hexamethyldisilazane, chlorosilane, aminosilane and the like, and paraffin-based compound and the like. The surface treating agent is not limited to them. Of these, carboxylic acid is preferable as a surface treating agent, since delayed curing hardly occurs when a curable silicone resin composition is produced. Among carboxylic acids, saturated fatty acid or unsaturated fatty acid are particularly preferable, since it is more unlikely to have an occurrence of delayed curing. Only one kind of these fillers may be used, or two or more kinds thereof may be mixed and used. When a cured product having high adhesive strength is desired, it is preferable to use heavy calcium carbonate and colloidal calcium carbonate in combination.

To have improved workability (coating processability and the like) of a composition and having matte surface of the cured product, addition of organic balloon or inorganic balloon is preferable. Such fillers can be subjected to a surface treatment. Only one kind of those fillers may be used, or two or more kinds thereof may be mixed and used. For improved workability (coating processability and the like), the particle size of the balloon is preferably not more than 0.1 mm. For matte surface of the cured product, the particle size of the balloon is preferably 5 to 300 μm.

The curable composition is preferably used as an adhesive for joint of exterior walls of housing such as sizing board, particularly ceramic sizing board, and the like, an adhesive for exterior wall tile, and an adhesive for exterior wall tile which remains in the joint, and the like, since chemical resistance or the like of a cured product is good. It is desirable to match the design of exterior wall and the design of the sealing material. Particularly, exterior walls with high grade by sputter coating, mixing with colored aggregate and the like are being used. When the curable composition is blended with a scale-like or granular substance having a diameter of not less than 0.1 mm, preferably about 0.1 to 5.0 mm or so, a sealing material as a cured product of the curable composition becomes superior, since it matches with such high grade exterior walls and shows superior chemical resistance, and therefore, the appearance of the sealing material is maintained for a long term. When a granular substance is used, the surface has a sanding-look or sandstone-look texture, and when a scale-like substance is used, the surface becomes a concave-convex surface due to the scale-like substance.

Preferable diameter, blending amount, material and the like of the scale-like or granular substance are as follows as described in Japanese Unexamined Patent Application, Publication No. H9-53063.

The diameter of the scale-like or granular substance is preferably not less than 0.1 mm, more preferably about 0.1 to 5.0 mm, and suitable diameter is selected according to the material, pattern and the like of the exterior wall. The scale-like or granular substance with diameter of about 0.2 mm to 5.0 mm or about 0.5 mm to 5.0 mm can also be used. In case of a scale-like substance, it is believed to have a thickness of about 1/10 to 1/5 of the diameter (about 0.01 to 1.00 mm). The scale-like or granular substance is mixed with the main sealing components in advance and delivered as a sealing material to the construction site, or mixed with the main sealing components on the construction site at the time of use.

The scale-like or granular substance is added at 1 to 200 parts by weight or so per 100 parts by weight of a composition such as a sealing material composition, an adhesive composition and the like that is not blended with the scale-like or granular substance. The blending amount is appropriately determined according to the size of individual scale-like or granular substances, and material, pattern and the like of the exterior wall.

As a scale-like or granular substance, naturally occurring substances such as silica sand, mica and the like, synthetic rubber, synthetic resin, inorganic materials such as alumina and the like are used. To enhance the design aspect when filled in a joint, the scale-like or granular substance is painted in a suitable color according to the material, pattern and the like of the exterior wall.

Preferable finishing method and the like are described in Japanese Unexamined Patent Application, Publication No. H9-53063.

When the curable composition is blended with a balloon (preferably having an average particle size of not less than 0.1 mm), a cured product having a surface with a sanding-look or sandstone-look texture can be formed, and also the weight of a cured product can be reduced. Preferable diameter, blending amount, material and the like of balloon are as described in Japanese Unexamined Patent Application, Publication No. H10-251618.

The balloon is a spherical filler with a hollow inside. The balloon can be added for lowering the weight (lowering density) of the composition. Examples of the material of the balloon include inorganic materials such as glass, white sand, silica and the like, and organic materials such as phenol resin, urea resin, polystyrene, saran and the like. The material of the balloon is not limited to them, and it is also possible to use a composite of an inorganic material and an organic material, or form multiple layers by lamination. A balloon consisting of an inorganic material, an organic material, or a composite of those materials can be used. Only one kind of a balloon made of the same material may be used, or plural kinds of balloons made of different kinds of materials may be mixed and used without any problem. Furthermore, a balloon having a processed or coated surface can also be used, and also, a balloon having a surface treated with various kinds of surface treating agents can be used. For example, an organic balloon coated with calcium carbonate, talc, titanium oxide and the like and an inorganic balloon surface-coated with a silane coupling agent and the like can be mentioned.

To obtain a surface with a sanding-look or sandstone-look texture, the balloon preferably has a particle size of not less than 0.1 mm. A balloon of a size of about 0.2 mm to 5.0 mm or about 0.5 mm to 5.0 mm can also be used. When the balloon has a particle size less than 0.1 mm, the viscosity of the composition is sometimes increased without providing the texture, even when added in a large amount. The blending amount of the balloon can be easily determined according to the degree of a desired sanding-look or sandstone-look texture. Generally, it is desirable to add balloon having a particle size of not less than 0.1 mm at a volume concentration of 5 to 25% by volume in the composition. When the volume concentration of the balloon is less than 5% by volume, the rough texture is absent, and when it exceeds 25% by volume, the viscosity of sealing material or adhesive becomes high, workability becomes poor, modulus of a cured product also becomes high, and the basic property of sealing material or adhesive tends to be impaired. A volume concentration affording a particularly preferable balance with the basic property of the sealing material is 8 to 22% by volume.

When a balloon is used, a slip preventive described in Japanese Unexamined Patent Application, Publication No. 2000-154368, and amidine compound described in Japanese Unexamined Patent Application, Publication No. 2001-164237, which affords a matte, in addition to concave-convex state, surface of a cured product, particularly primary and/or secondary amine having a melting point of not less than 35° C., can be added.

Specific examples of the balloon are shown in each publication of Japanese Unexamined Patent Application, Publication No. H2-129262, Japanese Unexamined Patent Application, Publication No. H4-8788, Japanese Unexamined Patent Application, Publication No. H4-173867, Japanese Unexamined Patent Application, Publication No. H5-1225, Japanese Unexamined Patent Application, Publication No. H7-113073, Japanese Unexamined Patent Application, Publication No. H9-53063, Japanese Unexamined Patent Application, Publication No. H10-251618, Japanese Unexamined Patent Application, Publication No. 2000-154368, Japanese Unexamined Patent Application, Publication No. 2001-164237, WO97/05201, and the like.

In addition, thermally expandable microparticle hollow material described in Japanese Unexamined Patent Application, Publication No. 2004-51701, Japanese Unexamined Patent Application, Publication No. 2004-66749, and the like can be used. The thermally expandable microparticle hollow material is a plastic sphere obtained by enclosing a low boiling point compound such as hydrocarbon having 1 to 5 carbon atoms and the like with a polymer outer shell material (vinylidene chloride-based copolymer, acrylonitrile-based copolymer, or vinylidene chloride-acrylonitrile copolymer) in spheres. When the area of adhesion of this composition is heated, the gas pressure in the shell of the thermally expandable microparticle hollow material increases, and the polymer outer shell material is softened to dramatically increase the volume thereof, which plays a role of detaching the adhesion interface. By adding thermally expandable microparticle hollow material, an adhesive composition that allows easy detachment by heating alone when unnecessary, without accompanying material destruction, and capable of detachment by heating, without using an organic solvent at all, can be obtained.

Even when the curable composition according to one or more embodiments of the present invention contains cured product particles for a sealing material, the cured product forms concaves and convexes on the surface thereof and improve the design. The preferable diameter, amount to be added, material and the like of the cured product particles for a sealing material are described in Japanese Unexamined Patent Application, Publication No. 2001-115142 as follows. The diameter thereof is preferably 0.1 mm to 1 mm, and more preferably about 0.2 to 0.5 mm. The blending amount of the cured product particles for a sealing material is preferably 5 to 100% by weight, more preferably 20 to 50% by weight in a curable composition which does not contain cured product particles for a sealing material. While the material thereof is not limited as long as it can be used as a sealing material, examples thereof include urethane resin, silicone, modified silicone, and polysulfide rubber, and modified silicone is preferable.

The use amount of the spherical hollow material is preferably 0.01 to 30 parts by weight, and particularly preferably 0.1 to 20 parts by weight relative to 100 parts by weight of the total weight of the polymer (A) and the polymer (B). When the use amount is less than 0.01 parts by weight, the workability-improving effect is absent, and when it exceeds 30 parts by weight, elongation and strength at break of a cured product tend to be low.

The curable composition may contain an anti-sagging agent, as necessary, to prevent sagging and improve workability. While the anti-sagging agent is not particularly limited, for example, polyamide wax; hydrogenated castor oil derivatives; metal soaps such as calcium stearate, aluminum stearate, barium stearate and the like can be mentioned as examples. When a rubber powder having a particle size of 10 to 500 μm as described in Japanese Unexamined Patent Application, Publication No. H11-349916 or an organic fiber as described in Japanese Unexamined Patent Application, Publication No. 2003-155389 is used, a composition showing high thixotropy and good workability can be obtained. Such anti-sagging agent may be used either singly, or two or more kinds thereof may be used in combination.

The use amount of the anti-sagging agent is preferably 0.1 to 20 parts by weight relative to 100 parts by weight of the total weight of the polymer (A) and the polymer (B).

The curable composition according to one or more embodiments of the present invention can contain an anti-oxidant (anti-aging agent). When an anti-oxidant is used, weather resistance of a cured product can be enhanced. Examples of the anti-oxidant include hindered phenol-based anti-oxidant, monophenol-based anti-oxidant, bisphenol-based anti-oxidant, and polyphenol-based anti-oxidant, and hindered phenol-based anti-oxidant is particularly preferable. Similarly, hindered amine photostabilizer such as Tinuvin 622 LD, Tinuvin 144; CHIMASSORB944LD, CHIMASSORB119FL (each of the above manufactured by Ciba Japan K.K.); Adekastab LA-57, Adekastab LA-62, Adekastab LA-67, Adekastab LA-63, and Adekastab LA-68 (each of the above is manufactured by ADEKA CORPORATION); Sanol LS-770, Sanol LS-765, Sanol LS-292, Sanol LS-2626, Sanol LS-1114, and Sanol LS-744 (each of the above is manufactured by Sankyo Lifetech Co., Ltd.), and the like can also be used. Specific examples of the anti-oxidant are also recited in Japanese Unexamined Patent Application, Publication No. H4-283259 and Japanese Unexamined Patent Application, Publication No. H9-194731.

The use amount of the anti-oxidant is preferably 0.1 to 10 parts by weight, particularly preferably 0.2 to 5 parts by weight relative to 100 parts by weight of the total weight of the polymer (A) and the polymer (B).

A photostabilizer can be used in the curable composition. Use of a photostabilizer prevents degradation of a cured product due to photooxidation. Examples of the photostabilizer include benzotriazole-based, hindered amine-based, benzoate-based compounds and the like, and a hindered amine-based photostabilizer is particularly preferable.

The use amount of the photostabilizer is preferably 0.1 to 10 parts by weight, particularly preferably 0.2 to 5 parts by weight relative to 100 parts by weight of the total weight of the polymer (A) and the polymer (B).

When a photocurable substance, particularly an unsaturated acrylic compound, is added to the curable composition, a tertiary amine-containing hindered amine-based photostabilizer is preferably used as a hindered amine-based photostabilizer, as described in Japanese Unexamined Patent Application, Publication No. H5-70531, to improve preservation stability of the composition. Examples of the tertiary amine-containing hindered amine-based photostabilizer include photostabilizers such as Tinuvin 622 LD, Tinuvin 144; CHIMASSORB119FL (each of the above manufactured by Ciba Japan K.K.); Adekastab LA-57, LA-62, LA-67, LA-63 (each of the above is manufactured by ADEKA CORPORATION); Sanol LS-765, LS-292, LS-2626, LS-1114, LS-744 (each of the above is manufactured by Sankyo Lifetech Co., Ltd.), and the like.

In the curable composition according to one or more embodiments of the present invention, an ultraviolet absorbing agent can be used. When an ultraviolet absorbing agent is used, weather resistance of the surface of a cured product can be enhanced. Examples of the ultraviolet absorbing agent include benzophenone-based, benzotriazole-based, salicylate-based, substituted tolyl-based and metal chelate-based compounds and the like, and benzotriazole-based one is particularly preferable, and examples thereof include product name Tinuvin P, Tinuvin 213, Tinuvin 234, Tinuvin 326, Tinuvin 327, Tinuvin 328, Tinuvin 329, and Tinuvin 571 (each of the above manufactured by BASF). Particularly preferred is a 2-(2H-1,2,3-benzotriazol-2-yl)-phenol-based compound. Furthermore, a combined use of a phenol-based anti-oxidant or a hindered phenol-based anti-oxidant, and a hindered amine-based photostabilizer, and a benzotriazole-based ultraviolet absorbing agent is preferable.

The use amount of the ultraviolet absorbing agent is preferably 0.1 to 10 parts by weight, particularly preferably 0.2 to 5 parts by weight relative to 100 parts by weight of the total weight of the polymer (A) and the polymer (B).

The curable composition may contain various additives as necessary to adjust various properties of a curable composition or a cured product. Examples of such additive include flame-retardant, curability adjusting agent, radical inhibitor, metal deactivator, antiozonant, phosphorus peroxide decomposer, lubricant, pigment, foaming agent, solvent, fungicide and the like. Only one kind of these various additives may be used, or two or more kinds thereof may be used in combination. Specific examples of the additive other than those recited in this specification are recited in each publication of Japanese Unexamined Patent Application, Publication No. H4-69659, Japanese Unexamined Patent Application, Publication No. H7-108928, Japanese Unexamined Patent Application, Publication No. S63-254149, Japanese Unexamined Patent Application, Publication No. S64-22904, Japanese Unexamined Patent Application, Publication No. 2001-72854 and the like.

The curable composition can also be prepared as a one-component type to be cured by moisture in the air after application by previously blending all components to be blended, and preserving the same after tight sealing, and it can also be prepared as a two-component type to be used by mixing a blending material with a polymer composition before use in which components like a separate curing catalyst as a curing agent, a filler, a plasticizer, water, and the like are blended in advance.

When the curable composition is a one-component type, all components to be blended are blended in advance, and therefore, components containing moisture to be blended are preferably dehydrated and dried before use, or dehydrated under reduced pressure during kneading. When the above-mentioned curable composition is a two-component type, a curing catalyst does not need to be added to a main agent containing a polymer having a reactive silicon group, and therefore, even when the blend contains some moisture, there is little change of having gellation. However, when storage stability over a long term is necessary, it is preferable to have dehydration and drying. As for the dehydration and drying method, in case of a solid such as powder and the like, a heating drying method is preferable, and in case of a liquid, a reduced pressure dehydrating method, or a dehydrating method using synthetic zeolite, activated alumina, silica gel and the like is preferable. It is also possible to perform dehydration by adding a small amount of an isocyanate compound to allow a reaction of the isocyanate group and water. The storage stability is further improved by adding lower alcohol such as methanol, ethanol and the like; alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane and the like, in addition to the dehydrating and drying method.

The use amount of a dehydrating agent, particularly, a silicon compound capable of reacting with water such as vinyltrimethoxysilane and the like is preferably 0.1 to 20 parts by weight, and particularly preferably 0.5 to 10 parts by weight relative to 100 parts by weight of the total weight of the polymer (A) and the polymer (B).

The curable composition may be added with a physical property modifier, as necessary, that controls the tensile property of a cured product to be generated. The physical property modifier is not particularly limited. Examples of the physical property modifier include alkylalkoxysilanes such as phenoxytrimethylsilane, methyltrimethoxysilane, dimethyldimethoxysilane, trimethylmethoxysilane, n-propyltrimethoxysilane and the like; arylalkoxysilanes such as diphenyldimethoxysilane, phenyltrimethoxysilane and the like; alkylisopropenoxysilanes such as dimethyldiisopropenoxysilane, methyltriisopropenoxysilane, γ-glycidoxypropylmethyldiisopropenoxysilane and the like; trialkylsilyl borates such as tris(trimethylsilyl) borate, tris(triethylsilyl) borate and the like; silicone varnish; polysiloxanes and the like. By using the physical property modifier, the hardness of the curable composition according to one or more embodiments of the present invention after curing may be increased or conversely decreased to improve elongation at break. Only one kind of the above-mentioned physical property modifier may be used, or two or more kinds thereof may be used in combination.

Particularly, a compound that forms a compound having a monovalent silanol group in a molecule by hydrolysis has an activity of lowering the modulus of the cured product without worsening the stickiness of the surface of the cured product. Particularly, a compound forming trimethylsilanol is preferable. As a compound that forms a compound having a monovalent silanol group in a molecule by hydrolysis, a compound described in Japanese Unexamined Patent Application, Publication No. H5-117521 can be mentioned as an example. In addition, a compound that forms a silicon compound to generate $R^3SiOH$ such as trimethylsilanol and the like by hydrolysis, which is a derivative of alkyl alcohol such as hexanol, octanol, decanol and the like, a compound that forms a silicon compound to generate $R^3SiOH$ such as trimethylsilanol and the like by hydrolysis, which is a derivative of polyvalent alcohol having not less than 3 hydroxyl groups, such as trimethylolpropane, glycerol, pentaerythritol, sorbitol and the like as described in Japanese Unexamined Patent Application, Publication No. H11-241029 can be mentioned as an example.

Furthermore, a compound that forms a silicon compound to generate $R^3SiOH$ such as trimethylsilanol and the like by hydrolysis, which is a derivative of an oxypropylene polymer described in Japanese Unexamined Patent Application, Publication No. H7-258534 can be mentioned as an example. Furthermore, polyoxyalkylene-based polymer having a crosslinkable hydrolyzable silicon group and a silicon group, which can be a monosilanol-containing compound by hydrolysis as described in Japanese Unexamined Patent Application, Publication No. H6-279693, can also be used.

In the curable composition, a tackifier resin can be added as necessary to enhance the adhesiveness and close adhesiveness to a substrate or other purposes. The tackifier resin is not particularly limited, and one generally used for the purpose of imparting adhesiveness can be used. Specific examples thereof include terpene-based resin, aromatic modified terpene resin, hydrogenated terpene resin obtained by hydrogenating same, terpene-phenol resin obtained by copolymerizing terpenes with phenols, phenol resin, modified phenol resin, xylene-phenol resin, cyclopentadiene-phenol resin, coumarone-indene resin, rosin resin, rosin ester resin, hydrogenated rosin ester resin, xylene resin, low-molecular weight polystyrene-based resin, styrene copolymer resin, petroleum resin (for example, C5 hydrocarbon resin, C9 hydrocarbon resin, C5C9 hydrocarbon copolymer resin etc.), hydrogenated petroleum resin, DCPD resin and the like. These may be used either singly, or two or more kinds thereof may be used in combination.

The styrene block copolymer and a hydrogenated product thereof are not particularly limited, and examples thereof include styrene-butadiene-styrene block copolymer (SBS), styrene-isoprene-styrene block copolymer (SIS), styrene-ethylene butylene-styrene block copolymer (SEBS), styrene-ethylenepropylene-styrene block copolymer (SEPS), styrene-isobutylene-styrene block copolymer (SIBS) and the like.

Of these, terpene-phenol resin is preferable since it shows high compatibility with the polymer (A) and the polymer (B) and allows obtainment of high tightly adhering effect. On the other hand, when color tone is important, a hydrocarbon resin is preferable.

The amount of the tackifier resin to be used is preferably 2 to 100 parts by weight, more preferably 5 to 50 parts by weight, and even more preferably 5 to 30 parts relative to 100 parts by weight of the total weight of the polymer (A) and the polymer (B). When the content is less than 2 parts by weight, an adhesion and close adhesion effect to a substrate is difficult to obtain, and when it exceeds 100 parts by weight, there may be a case in which the viscosity of a curable composition becomes too high and handling becomes difficult.

An epoxy group-containing compound can be used for the curable composition. By the use of a compound containing an epoxy group, the recovery property of the cured product can be increased. As a compound containing an epoxy group, epoxidized unsaturated fats and oils, epoxidized unsaturated fatty acid esters, alicyclic epoxy compounds, compounds shown as epichlorohydrin derivative and mixtures thereof and the like can be mentioned as examples. Specifically, epoxidized soy bean oil, epoxidized linseed oil, bis(2-ethylhexyl)-4,5-epoxycyclohexane-1,2-dicarboxylate (E-PS), epoxyoctyl stearate, epoxybutyl stearate and the like can be mentioned as examples. Of these, E-PS is particularly preferable. An epoxy compound is preferably used within a range of 0.5 to 50 parts by weight relative to 100 parts by weight of the total weight of the polymer (A) and the polymer (B).

A photocurable substance can be used for the curable composition. When a photocurable substance is used, a film of the photocurable substance is formed on the surface of the cured product, and thus the stickiness and weather resistance of the cured product can be improved. The photocurable substance is a substance that shows chemical changes of the molecular structure in a considerably short time and produces physical changes such as curing by the action of light. As such kinds of compounds, many are known such as organic monomer, oligomer, resin, compositions containing same and the like. Any commercially available product can be used as a photocurable substance. Representative examples of the photocurable substances that can be used include unsaturated acrylic compound, polyvinyl cinnamate, azide resin and the like. Examples of unsaturated acrylic compound include a monomer, an oligomer, or a mixture thereof, having one to several acrylic or methacrylic unsaturated groups, for example, a monomer like propylene (or butylene, ethylene) glycol di(meth)acrylate, and neopentyl glycol di(meth)dimethacrylate and the like and an oligoester having a molecular weight of not more than 10,000. Specific examples include special acrylate (bifunctional) Aronix M-210, Aronix M-215, Aronix M-220, Aronix M-233, Aronix M-240, Aronix M-245; (trifunctional) Aronix M305, Aronix M-309, Aronix M-310, Aronix M-315, Aronix M-320, Aronix M-325, and (polyfunctional) Aronix M-400 and the like, and particularly, a compound containing an acrylic functional group is preferable, and a compound containing three or more same functional groups on average in one molecule is preferable (all Aronix recited above are a product of Toagosei Co., Ltd.).

Examples of polyvinyl cinnamate include a photosensitive resin having a cinnamoyl group as a photosensitive group, in which polyvinyl alcohol is esterified by cinnamic acid, and many other polyvinyl cinnamate derivatives are also exemplified. Azide resin is known to be a photosensitive resin containing an azido group as a photosensitive group, and it is generally a rubber photosensitive liquid containing a diazide compound as a photosensitizer, and detailed examples are disclosed in "Photosensitive Resin" (Insatsu Gakkai Shuppanbu Ltd., page 93-, page 106-, page 117-, Mar. 17, 1972). They can be used singly or mixed and added with a sensitizer as necessary and used. When a sensitizer such as ketones, nitro compound and the like or a promoter such as amines and the like is added, the addition effect is sometimes enhanced. The amount of the photocurable substance to be used is preferably within a range of 0.1 to 20 parts by weight, and more preferably 0.5 to 10 parts by weight relative to 100 parts by weight of the total weight of the polymer (A) and the polymer (B), and when the amount is 0.1 parts by weight or less, there is no effect of enhancing the weather resistance, and when the amount is 20 parts by weight or more, the cured product becomes too hard and tends to yield a crack.

An oxygen curable substance can be used in the curable composition. As the oxygen curable substance, an unsaturated compound reactive with oxygen in the air can be mentioned as an example, and it reacts with oxygen in the air, forms a cured film near the surface of the cured product and prevents stickiness of the surface and attachment of dust and dirt to the surface of the cured product. Specific examples of the oxygen curable substance include dry oil such as tung oil, linseed oil and the like, various alkyd resins obtained by modifying dry oil; acrylic polymer, epoxy resin and silicone resin, each modified by dry oil; liquid polymers such as 1,2-polybutadiene, 1,4-polybutadiene, C5 to C8 diene polymer and the like obtained by polymerization or copolymerization of diene compounds such as butadiene, chloroprene, isoprene, 1,3-pentadiene and the like; liquid copolymers such as NBR, SBR and the like obtained by copolymerization of monomers such as acrylonitrile, styrene and the like, which are copolymerizable with these diene compounds, such that the diene compound becomes the main component, various modified products of the above (maleic modified products, boil oil modified products and the like) and the like. They may be used either singly, or two or more kinds thereof may be used in combination. Of these, tung oil and liquid diene polymer are preferable. A combined use of a catalyst promoting the oxidation curing reaction or a metal dryer may enhance the effect thereof. As such catalyst and metal dryer, metal salts such as cobalt naphthenate, lead naphthenate, zirconium naphthenate, cobalt octylate, zirconium octylate and the like, amidine compound and the like can be mentioned as examples. The use amount of an oxygen curable substance is preferably within a range of 0.1 to 20 parts by weight, and more preferably 0.5 to 10 parts by weight relative to 100 parts by weight of the total weight of the polymer (A) and the polymer (B). When the use amount is less than 0.1 parts by weight, improvement of the contamination property may become insufficient, and when it exceeds 20 parts by weight, the tensile property and the like of the cured product tend to be impaired. As described in Japanese Unexamined Patent Application, Publication No. H3-160053, the oxygen curable substance is preferably used in combination with a photocurable substance.

The curable composition may be added with an epoxy resin. The composition added with an epoxy resin is particularly preferable as an adhesive, especially an adhesive for exterior wall tiles. Examples of the epoxy resin include, but are not limited to, flame-retardant epoxy resins such as epichlorohydrin-bisphenol A epoxy resin, epichlorohydrin-bisphenol F epoxy resin, tetrabromobisphenol A glycidyl ether and the like, novolac epoxy resin, hydrogenated bisphenol A epoxy resin, glycidyl ether epoxy resin of bisphenol A propylene oxide adduct, p-oxybenzoic acid glycidyl ether ester epoxy resin, m-aminophenol-based epoxy resin, diaminodiphenylmethane-based epoxy resin, urethane modified epoxy resin, various kinds of alicyclic epoxy resins, N,N-diglycidyl aniline, N,N-diglycidyl-o-toluidine, triglycidyl isocyanurate, polyalkylene glycol diglycidyl ether, glycidyl ethers of polyvalent alcohol such as glycerol and the like, hydantoin epoxy resin, epoxy product of unsaturated polymers such as petroleum resin and the like. The epoxy resin is not limited to them, and any epoxy resin that is commonly used can be also used. An epoxy resin containing at least two epoxy groups in a molecule is preferable, since it shows high reactivity during curing, and a cured product easily forms a three-dimensional network and the like. More preferred epoxy resin is bisphenol A type epoxy resins or novolac type epoxy resin and the like. The ratio (weight ratio) of these epoxy resins to be used is in the range as follows: the polymer (A)+the polymer (B)/epoxy resin=100/1 to 1/100. When the ratio of (the polymer (A)+the polymer (B))/epoxy resin is less than 1/100, an improving effect on the impact strength and toughness by the epoxy resin cured product is difficult to obtain, and when the ratio of (the polymer (A)+the polymer (B))/epoxy resin exceeds 100/1, it is difficult to obtain desired strength of a cured product of the polymer. A preferable use ratio cannot be determined unconditionally, since it varies depending on the use of a curable resin composition and the like, but, when impact resistance, flexibility, toughness, peel strength and the like of an epoxy resin cured product are to be improved, for example, the polymer (A) and the polymer (B) are preferably used, in terms of their total amount, at 1 to 100 parts by weight, more preferably 5 to 100 parts by weight relative to 100 parts by weight of epoxy resin. On the other hand, when the strength of a cured product is to be improved, 1 to 200 parts by weight, and more preferably 5 to 100 parts by weight of an epoxy resin is used relative to 100 parts by weight of the total weight of the polymer (A) and the polymer (B).

When an epoxy resin is added, the curable composition can naturally contain a curing agent for curing the epoxy resin for combined use. A usable curing agent is not particularly limited, and a conventionally-used curing agent for epoxy resin can be used. Specific examples thereof include primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine terminal polyether and the like; tertiary amines such as 2,4,6-tris(dimethylaminomethyl) phenol, tripropylamine and the like, and salts of those tertiary amines; polyamide resins; imidazoles; dicyanodiamides; boron trifluoride complex compounds; carboxylic anhydrides such as phthalic anhydride, hexahydrophthalic anhydride, tetrahydrophthalic anhydride, dodecinyl succinic anhydride, pyromellitic anhydride, chlorenic anhydride and the like; alcohols; phenols; carboxylic acids; compounds such as diketone complex compound of aluminum or zirconium and the like. The curing agent is not limited to them. The curing agent may be used either singly, or two or more kinds thereof may be used in combination.

When a curing agent for epoxy resin is used, the amount thereof to be used is preferably within a range of 0.1 to 300 parts by weight per 100 parts by weight of the epoxy resin.

As a curing agent of an epoxy resin, ketimine can be used. Ketimine is stably present in a state free of moisture, and decomposed into primary amine and ketone by moisture, and the resulting primary amine is a room temperature-curable curing agent for the epoxy resin. Use of ketimine enables obtainment of a one-liquid type composition. Such ketimine can be obtained by the condensation reaction of an amidine compound and a carbonyl compound.

For the synthesis of ketimine, known amidine and carbonyl compounds can be preferably used. For example, as amidine compound, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine and the like; polyvalent amines such as 1,2,3-triaminopropane, triaminobenzene, tris(2-aminoethyl)amine, tetra(aminomethyl)methane and the like; polyalkylenepolyamines such as diethylenetriamine, triethylenetriamine, tetraethylenepentamine and the like; polyoxyalkylene-based polyamine; aminosilanes such as γ-aminopropyltriethoxysilane, N-(β-aminoethyl)-γ-aminopropyltrimethoxysilane, N-(β-aminoethyl)-γ-aminopropylmethyldimethoxysilane and the like; and the like can be used. As the carbonyl compound, aldehydes such as acetaldehyde, propionaldehyde, n-butylaldehyde, isobutylaldehyde, diethylacetoaldehyde, glyoxal, benzaldehyde and the like; cyclic ketones such as cyclopentanone, trimethylcyclopentanone, cyclohexanone, trimethylcyclohexanone and the like; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone and the like; β-dicarbonyl compounds such as acetylacetone, methyl acetoacetate, ethyl acetoacetate, dimethyl malonate, diethyl malonate, methyl ethyl malonate, dibenzoylmethane and the like; and the like can be used.

When an imino group is present in ketimine, the imino group may be reacted with styrene oxide; glycidyl ethers such as butylglycidyl ether, allyl glycidyl ether and the like; glycidyl ester and the like. The ketimine may be used either singly, or two or more kinds thereof may be used in combination. Ketimine is used in an amount of 1 to 100 parts by weight per 100 parts by weight of the epoxy resin, in which the amount of use varies depending on the kind of epoxy resin and ketimine.

The curable composition according to one or more embodiments of the present invention may be added with a flame-retardant including a phosphorus plasticizer such as ammonium polyphosphate, tricresyl phosphate and the like, and aluminum hydroxide, magnesium hydroxide, and thermally expandable black lead and the like. The above-mentioned flame-retardant may be used either singly, or two or more kinds thereof may be used in combination.

A flame-retardant is used at 5 to 200 parts by mass, preferably 10 to 100 parts by mass relative to 100 parts by weight of the total weight of the polymer (A) and the polymer (B).

The curable composition may be added with various additives as necessary to adjust various properties of a curable composition or a cured product. Examples of such additive include a curability adjusting agent, a radical inhibitor, a metal deactivator, an antiozonant, a phosphorus peroxide decomposer, a lubricant, a pigment, a foaming agent, a fungicide, and the like. Only one kind of these various additives may be used, or two or more kinds thereof may be used in combination. Specific examples of the additive other than those recited in this specification are recited in each publication of Japanese Examined Patent Application, Publication No. H4-69659, Japanese Examined Patent Application, Publication No. H7-108928, Japanese Unexamined Patent Application, Publication No. S63-254149, Japanese Unexamined Patent Application, Publication No. 64-22904, Japanese Unexamined Patent Application, Publication No. 2001-72854 and the like.

The curable composition can also be prepared as a one-component type to be cured by moisture in the air after application by previously blending all components to be blended, and preserving the same after tight sealing. In addition, it can also be prepared as a two-component type to be used by mixing a blending material with a polyoxyalkylene-based polymer composition before use in which components like a separate curing catalyst as a curing agent, a filler, a plasticizer, water, and the like are blended in advance. In view of the workability, a one-component type is preferable.

When the above-mentioned curable composition is a one-component type, all components to be blended are blended in advance, and therefore components containing moisture to be blended are preferably dehydrated and dried before use, or dehydrated under reduced pressure during kneading. When the above-mentioned curable composition is a two-component type, a curing catalyst does not need to be added to a main agent containing a polyoxyalkylene-based polymer having a reactive silicon group, and therefore, even when the blend contains some moisture, there is little change of having gellation. However, when storage stability over a long term is necessary, it is preferable to have dehydration and drying. As for the dehydration and drying method, in case of a solid such as powder and the like, a heating drying method is preferable, and in case of a liquid, a reduced pressure dehydrating method, or a dehydrating method using synthetic zeolite, activated alumina, silica gel, quick lime, magnesium oxide, and the like is preferable. In addition, it is also possible to perform dehydration by adding a small amount of an isocyanate compound to allow a reaction of the isocyanate group and water. It is also possible that an oxazolidine compound like 3-ethyl-2-methyl-2-(3-methylbutyl)-1,3-oxazolidine is blended and reacted with water followed by dehydration. The storage stability is further enhanced by adding lower alcohol such as methanol, ethanol and the like; alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane and the like, in addition to the dehydrating and drying method.

The use amount of a dehydrating agent, particularly silicon compounds capable of reacting with water such as vinyltrimethoxysilane and the like, is within a range of 0.1 to 20 parts by weight, and preferably 0.5 to 10 parts by weight relative to 100 parts by weight of the total weight of the polymer (A) and the polymer (B).

The production method of the curable composition is not particularly limited, and, for example, it is possible to have a conventional method including blending the above-mentioned components, kneading the mixture using a mixer, a roll, a kneader and the like at ambient temperature or under heating, or a method including dissolving the above-mentioned components in a small amount of a solvent followed by mixing.

The curable composition can be used as a cohesive, a sealing material for structures, boats and ships, automobiles, roads and the like, adhesive, molding agent, vibrant insulating material, vibration damper, acoustic insulating material, foaming material, paint, spraying material, waterproofing agent for a coating film, and the like. Since a cured product obtained by curing the curable composition has favorable adhesiveness for various kinds of an adherend, it is more preferably used as a sealing material or an adhesive.

In addition, the curable composition can be used for various uses including electric or electronic component materials such as solar battery rear surface sealant and the like, electrical insulating materials such as insulation covering material for electric wire or cable and the like, elastic adhesive, contact-type adhesive, spray-type sealing material, crack repairing material, tiling adhesive, powder coating, casting material, medical rubber material, medical cohesive, medical equipment sealant, food packaging material, joint sealing material for jacket material such as sizing board and the like, coating material, primer, conductive material for shielding electromagnetic wave, thermally conductive material, hot melt material, electric/electronic potting agent, film, gasket, various molding material, as well as rustproof or waterproof sealing material for wire glass or laminate glass end surface (cut section), liquid sealant used for automobile parts, electric parts, various machine components and the like. Moreover, since the cured product can be closely adhered to a wide range of substrates such as glass, porcelain, wood, metal, resin molded products and the like by the curable composition alone or with an aid of a primer, the curable composition can also be used as various types of tight-sealing composition or adhesive composition. Furthermore, the curable composition can be used as adhesive for interior panels, adhesive for exterior panels, tiling adhesive, stone finishing adhesive, ceiling finishing adhesive, floor finishing adhesive, wall finishing adhesive, vehicle paneling adhesive, electric or electronic or precision equipment assembly adhesive, sealing material for direct glazing, multi-layer glass sealing material, SSG method sealing material, or structure working joint sealing material.

EXAMPLES

One or more embodiments of the present invention are explained in greater detail in the followings by referring to specific Examples, but the present invention is not limited to the following Examples.

Synthesis Example 1

0.42 Parts by weight of copper (I) bromide and 20.0 parts by weight of butyl acrylate were charged in a reactor which has been prepared to be in oxygen-free state and stirred under heating. 8.8 Parts by weight of acetonitrile as a solvent for polymerization and 1.90 parts by weight of ethyl 2-bromoadipate as an initiator were added thereto followed by mixing, and when the temperature of the mixed solution is adjusted to 80° C. approximately, pentamethyldiethylenetriamine (hereinbelow to be abbreviated as triamine) was added to initiate the polymerization reaction. Subsequently, 80.0 parts by weight of butyl acrylate were gradually added to have a progress of the polymerization reaction. During the polymerization, triamine was suitably added and the polymerization rate was adjusted. Total amount of the triamine used for the polymerization was 0.15 parts by weight. When the monomer conversion rate (polymerization reaction rate) is about 95% or more, the volatiles were removed by volatilization under reduced pressure to obtain a polymer concentrate. The concentrate was diluted with toluene and added with a filter aid and an adsorbent (KYOWAAD 700SEN: manufactured by Kyowa Chemical Industry Co., Ltd.), and hydrotalcite (KYOWAAD 500SH manufactured by Kyowa Chemical Industry Co., Ltd.), and after stirring under heating at 80 to 100° C. or so, the solid matter was removed by filtration. The filtered solution was concentrated under reduced pressure to obtain a crude polymer product. The crude polymer product, 1.98 parts by weight of potassium acrylate, 4-hydroxy-TEMPO (100 ppm), and 100 parts by weight of dimethyl acetamide as a solvent were added, and after the reaction for 3 hours at 70° C., the solvent was removed by distillation under reduced pressure to obtain a polymer concentrate. The concentrate was diluted with toluene and the solid matter was removed by filtration. The filtered solution was concentrated under reduced pressure to obtain macromonomer (a-1) which has an acryloyl group on the single terminal, number average molecular weight of 10,500 (molecular weight based on polystyrene which is measured by using HLC-8120GPC manufactured by Tosoh Corporation as a solution delivery system, TSK-GEL H type manufactured by Tosoh Corporation as a column, and THF as a solvent), and molecular weight distribution (Mw/Mn) of 1.18.

Synthesis Example 2

0.42 Parts by weight of copper (I) bromide, 12.5 parts by weight of butyl acrylate, 3.7 parts by weight of ethyl acrylate, and 1.6 parts by weight of stearyl acrylate were charged in a reactor which has been prepared to be in oxygen-free state and stirred under heating. 8.8 Parts by weight of acetonitrile as a solvent for polymerization and 1.90 parts by weight of ethyl 2-bromoadipate as an initiator were added thereto followed by mixing, and when the temperature of the mixed solution is adjusted to 80° C. approximately, triamine was added to initiate the polymerization reaction. Subsequently, 50.2 parts by weight of butyl acrylate, 14.6 parts by weight of ethyl acrylate, and 11.4 parts by weight of stearyl acrylate were gradually added to have a progress of the polymerization reaction. During the polymerization, triamine was suitably added and the polymerization rate was adjusted. Total amount of the triamine used for the polymerization was 0.15 parts by weight. When the monomer conversion rate (polymerization reaction rate) is about 95% or more, the volatiles were removed by volatilization under reduced pressure to obtain a polymer concentrate. The concentrate was diluted with toluene and added with a filter aid and an adsorbent (KYOWAAD 700SEN: manufactured by Kyowa Chemical Industry Co., Ltd.), and hydrotalcite (KYOWAAD 500SH manufactured by Kyowa Chemical Industry Co., Ltd.), and after stirring under heating at 80 to 100° C. or so, the solid matter was removed by filtration. The filtered solution was concentrated under reduced pressure to obtain a crude polymer product. The crude polymer product, 1.98 parts by weight of potassium acrylate, 4-hydroxy-TEMPO (100 ppm), and 100 parts by weight of dimethyl acetamide as a solvent were added, and after the reaction for 3 hours at 70° C., the solvent was removed by distillation under reduced pressure to obtain a polymer concentrate. The concentrate was diluted with toluene and the solid matter was removed by filtration. The filtered solution was concentrated under reduced pressure to obtain macromonomer (a-2) which has an acryloyl group on the single terminal, number average molecular weight of 10,900 (calculated in the same manner as Synthesis Example 1), and molecular weight distribution (Mw/Mn) of 1.14.

Synthesis Example 3

To a four-necked flask equipped with stirrer, 45.9 parts by weight of isobutanol were added, and under nitrogen atmosphere, the temperature was raised to 105° C. A mixture solution in which 35.0 parts by weight of methyl methacrylate, 25.0 parts by weight of stearyl methacrylate, 30 parts by weight of the macromonomer (a-1) which has been synthesized in Synthesis Example 1, 10.0 parts by weight of 3-methacryloxypropyltrimethoxysilane, 4.0 parts by weight of 3-mercaptopropyltrimethoxysilane, and 2.5 parts by weight of 2,2'-azobis(2-methylbutyronitrile) are dissolved in 25.2 parts by weight of isobutanol was added dropwise thereto over 5 hours. In addition, the polymerization was carried out for 2 hours at 105° C. to obtain an isobutanol solution of reactive silicon group-containing (meth)acrylic acid ester polymer (A-1) (solid content of 60%), which has 2.9 silicon groups on average per molecule, 0.3 macromonomer introduced on average per molecule, number average molecular weight of 3,800, and weight average molecular weight of 9,000 (measured in the same manner as Synthesis Example 1). The reactive silicon group equivalents of the solid matter was 0.61 mmol/g. To see whether or not the macromonomer is copolymerized, determination was made by following the loss of the (a-1) peak and occurrence of high molecular weight according to GPC measurement. As a result, it was found that the (a-1) has been copolymerized.

Synthesis Example 4

To a four-necked flask equipped with stirrer, 45.9 parts by weight of isobutanol were added, and under nitrogen atmosphere, the temperature was raised to 105° C. A mixture solution in which 35.0 parts by weight of methyl methacrylate, 25.0 parts by weight of stearyl methacrylate, 30 parts by weight of the macromonomer (a-2) which has been synthesized in Synthesis Example 2, 10.0 parts by weight of 3-methacryloxypropyltrimethoxysilane, 4.0 parts by weight of 3-mercaptopropyltrimethoxysilane, and 2.5 parts by weight of 2,2'-azobis(2-methylbutyronitrile) are dissolved in 25.2 parts by weight of isobutanol was added dropwise thereto over 5 hours. In addition, the polymerization was carried out for 2 hours at 105° C. to obtain an isobutanol solution of reactive silicon group-containing (meth)acrylic acid ester polymer (A-2) (solid content of 60%), which has 2.9 silicon groups on average per molecule, 0.3 macromonomer introduced on average per molecule, number average molecular weight of 3,700, and weight average molecular weight of 8,900 (measured in the same manner as Synthesis Example 1). The reactive silicon group equivalents of the solid matter was 0.61 mmol/g. To see whether or not the macromonomer is copolymerized, determination was made by following the loss of the (a-2) peak and occurrence of high molecular weight according to GPC measurement. As a result, it was found that the (a-2) has been copolymerized.

Synthesis Example 5

To a four-necked flask equipped with stirrer, 45.9 parts by weight of isobutanol were added, and under nitrogen atmosphere, the temperature was raised to 105° C. A mixture solution in which 35.0 parts by weight of methyl methacrylate, 30 parts by weight of butyl acrylate, 25.0 parts by weight of stearyl methacrylate, 10.0 parts by weight of 3-methacryloxypropyltrimethoxysilane, 4.0 parts by weight of 3-mercaptopropyltrimethoxysilane, and 2.5 parts by weight of 2,2'-azobis(2-methylbutyronitrile) are dissolved in 25.2 parts by weight of isobutanol was added dropwise thereto over 5 hours. In addition, the polymerization was carried out for 2 hours at 105° C. to obtain an isobutanol solution of reactive silicon group-containing (meth)acrylic acid ester polymer (P-1) (solid content of 60%), which has 2.1 silicon groups on average per molecule, number average molecular weight of 3,600, and weight average molecular weight of 7,400 (measured in the same manner as Synthesis Example 1). The reactive silicon group equivalents of the solid matter was 0.61 mmol/g.

Synthesis Example 6

To a four-necked flask equipped with stirrer, 45.9 parts by weight of isobutanol were added, and under nitrogen atmosphere, the temperature was raised to 105° C. A mixture solution in which 65.0 parts by weight of methyl methacrylate, 25 parts by weight of 2-ethylhexyl acrylate, 10.0 parts by weight of 3-methacryloxypropyltrimethoxysilane, 8.0 parts by weight of 3-mercaptopropyltrimethoxysilane, and 2.5 parts by weight of 2,2'-azobis(2-methylbutyronitrile) are dissolved in 25.2 parts by weight of isobutanol was added dropwise thereto over 5 hours. In addition, the polymerization was carried out for 2 hours at 105° C. to obtain an isobutanol solution of reactive silicon group-containing (meth)acrylic acid ester polymer (P-2) (solid content of 60%), which has 1.8 silicon groups on average per molecule, number average molecular weight of 2,410, and weight average molecular weight of 3,900 (measured in the same manner as Synthesis Example 1). The reactive silicon group equivalents of the solid matter was 0.81 mmol/g.

TABLE 1

| Monomer composition | | Homo-polymer Tg (° C.) | Polymer A-1 | Polymer A-2 | Polymer P-1 | Polymer P-2 |
|---|---|---|---|---|---|---|
| Monomer | MMA [1] | 105 | 35.0 | 35.0 | 35.0 | 65.0 |
|  | BA [2] | −55 |  |  | 30.0 |  |
|  | 2-EHA [3] |  |  |  |  | 25.0 |
|  | SMA [4] | −100 | 25.0 | 25.0 | 25.0 |  |
|  | Macro-monomer (a-1) | −55 | 30.0 |  |  |  |
|  | Macro-monomer (a-2) |  |  | 30.0 |  |  |
|  | TSMA [5] | — | 10.0 | 10.0 | 10.0 | 10.0 |
|  | T-MSi [6] | — | 4.0 | 4.0 | 4.0 | 8.0 |
| Mn |  |  | 3800 | 3700 | 3600 | 2410 |
| Mw |  |  | 9000 | 8900 | 7400 | 3900 |
| Number of macromonomer per molecule |  |  | 0.3 | 0.3 | — | — |
| Mean number of silicion group per molecule1 |  |  | 2.9 | 2.9 | 2.1 | 1.8 |
| Equivalents of reactive silicon group (mmol/g) |  |  | 0.61 | 0.61 | 0.61 | 0.81 |

[1] Methyl methacrylate
[2] n-Butyl acrylate
[3] 2-Ethylhexyl acrylate
[4] Stearyl acrylate
[5] 3-Methacryloxypropyltrimethoxysilane
[6] 3-Mercaptopropyltrimethoxyxilane

Synthesis Example 7

Polymerization of propylene oxide was carried out by using polyoxypropylene diol having a number average molecular weight of about 2,000 as an initiator and zinc hexacyanocobaltate glyme complex as a catalyst to obtain polyoxypropylene diol having a number average molecular weight of about 28,500 (measured in the same manner as Synthesis Example 1). Subsequently, a methanol solution containing 1.0 molar equivalent of NaOMe relative to the hydroxyl group of polyoxypropylene having hydroxyl group on the terminal was added, methanol was removed by distillation, and then allyl glycidyl ether was added in an amount of 1.0 molar equivalent relative to the hydroxyl group followed by the reaction for 2 hours at 130° C. After that, a methanol solution containing 0.28 equivalent of sodium methoxide was added, methanol was removed, and 1.79 molar equivalents of 3-chloro-1-propene was added to convert the terminal hydroxyl group to an allyl group. Unreacted allyl chloride was removed by volatilization under reduced pressure. Then, 300 parts by weight of n-hexane and 300 parts by weight of water were mixed and stirred with 100 parts by weight of the obtained unpurified polyoxypropylene having allyl group on the terminal, and water was removed by centrifugation. 300 Parts by weight of water were further mixed and stirred with the obtained hexane solution and water was removed again by centrifugation. After that, hexane was removed by volatilization under reduced pressures. As a result, a polyoxypropylene polymer having 2.1 carbon-carbon unsaturated bonds on average on one terminal site was obtained. Next, 72 ppm of a platinum divinyldisiloxane complex (3% by weight isopropanol solution based on platinum) was added per 100 parts by weight of the obtained polymer, and 2.9 parts by weight of triethoxysilane were slowly added dropwise with stirring followed by reaction at 90° C. for 2 hours. In addition, the terminal ethoxy group was converted to a methoxy group by adding 20 parts by weight of methanol and 12 ppm of HCl, and accordingly, a linear reactive silicon group-containing polyoxypropylene polymer (B-1) which has a trimethoxysilyl group on the terminal, 3.2 silicon groups on average per molecule and number average molecular weight of 28,500 was obtained.

Synthesis Example 8

Polymerization of propylene oxide was carried out by using polyoxypropylene diol having a number average molecular weight of about 2,000 as an initiator and zinc hexacyanocobaltate glyme complex as a catalyst to obtain polyoxypropylene diol having a number average molecular weight of about 28,500 (measured in the same manner as Synthesis Example 1). Subsequently, a methanol solution containing 1.0 molar equivalent of NaOMe relative to the hydroxyl group of polyoxypropylene having hydroxyl group on the terminal was added, methanol was removed by distillation, and then allyl glycidyl ether was added in an amount of 1.0 molar equivalent relative to the hydroxyl group followed by the reaction for 2 hours at 130° C. After that, a methanol solution containing 0.28 equivalent of sodium methoxide was added, methanol was removed, and 1.79 molar equivalents of 3-chloro-1-propene was added to convert the terminal hydroxyl group to an allyl group. Unreacted allyl chloride was removed by volatilization under reduced pressure. Then, 300 parts by weight of n-hexane and 300 parts by weight of water were mixed and stirred with 100 parts by weight of the obtained unpurified polyoxypropylene having allyl group on the terminal, and water was removed by centrifugation. 300 Parts by weight of water were further mixed and stirred with the obtained hexane solution and water was removed again by centrifugation. After that, hexane was removed by volatilization under reduced pressures. As a result, a polyoxypropylene polymer having 2.1 carbon-carbon unsaturated bonds on average on one terminal site was obtained. Next, 36 ppm of a platinum divinyldisiloxane complex (3% by weight isopropanol solution based on platinum) was added per 100 parts by weight of the obtained polymer, and 1.9 parts by weight of dimethoxymethylsilane were slowly added dropwise with stirring followed by reaction at 90° C. for 2 hours, and accordingly, a linear reactive silicon group-containing polyoxypropylene polymer (B-2) which has a dimethoxymethylsilyl group on the terminal, 3.2 silicon groups on average per molecule, and number average molecular weight of 28,500 was obtained.

Example 1

50.0 Parts by weight of the reactive silicon group-containing polyoxypropylene polymer (B-1) which has been obtained in Synthesis Example 7 and 83.3 parts by weight of the isobutanol solution of (meth)acrylic acid ester polymer (A-1) containing macromonomer and reactive silicon group which has been obtained in Synthesis Example 3 were admixed with each other followed by removal of the isobutanol according to distillation under reduced pressure, and thus a curable composition with polymer weight ratio of (A-1)/(B-1)=50/50 was obtained. To 100 parts by weight of the resulting polymer mixture, 70 parts by weight of heavy calcium carbonate manufactured by Maruo Calcium Co., Ltd., product name: NANOX #30), a thixotropic agent (manufactured by Kusumoto Chemicals, Ltd., product name: Disparlon 6500), and 1 part by weight of an anti-oxidant (manufactured by BASF, product name Irganox 245) were added, and after sufficient kneading, the mixture was allowed to pass once through a three-roll paint mill, and each component was dispersed. After that, dehydration under reduced pressure at 120° C. was carried out for 2 hours, the dehydrated mixture was cooled to 50° C. or less, and the cooled mixture was added with 5 parts by weight of vinyltrimethoxysilane (manufactured by Momentive, product name: Silquest A-171) as a dehydrating agent, 5 parts by weight of N-(2-aminoethyl)-3-aminopropyltrimethoxysilane (manufactured by Shin-Etsu Chemical Co., Ltd., product name: KBM-603) as an adhesiveness imparting agent, and 0.3 parts by weight of dioctyl tin dilaurate (manufactured by Nitto Kasei Co., Ltd., product name: NEOSTANN U-810) as a catalyst, and the mixture was kneaded in a state in which there is substantially no moisture. After that, the obtained composition was filled in a moisture-proof cartridge followed by sealing to obtain a one-component type curable composition.

(Evaluation)

Viscosity of the prepared curable composition and tensile properties of the cured product were measured according to the methods that are described below.

(Viscosity)

Viscosity of the curable composition was measured at 23° C., relative humidity of 50% by measuring the viscosity at revolution number of 2 rpm, 10 rpm using BS type viscometer (manufactured by Toki Sanjyo Co., Ltd.). The results are shown in Table 2.

(Tensile Properties)

A 3 mm-thick polyethylene mold was filled with a curable composition while avoiding entry of air bubbles, followed by curing at 23° C. and 50% of relative humidity for 3 days and additionally at 50° C. for 4 days to obtain a cured product. According to JIS K 6251, No. 3 dumbbell specimens were punched out from the obtained cured product and subjected to tensile test (tensile rate of 200 mm/min at 23° C. and 50% of relative humidity) to measure the modulus at 50% elongation (M50), strength at break (TB), and elongation rate at break (EB). The results are shown in Table 2.

(Tensile Shear Strength)

An adhesiveness test was carried out by using aluminum, polycarbonate (PC), and ABS (adhesion area of 25 mm×12.5 mm) as an adherend. The curable composition was applied to the adherend, and after having open time of 2 minutes, the adherends were adhered to each other. The adhesion time was set as the start time, and curing was carried out at 23° C. and 50% of relative humidity for 10 days and additionally at 50° C. for 4 days, and after that, the measurement of the tensile shear adhesive strength was carried out (test rate was 50 mm/min). The results are shown in Table 2.

Examples 2 to 4 and Comparative Example 1

One-component type curable composition was prepared in the same manner as Example 1 except that two kinds selected from the polymer (A), the polymer (B), and the polymer (P), a plasticizer, a filler, a thixotropic agent, an anti-oxidant, a dehydrating agent, an adhesiveness imparting agent, and a curing catalyst were admixed with one another at the blending ratio shown in Table 2, and the evaluation was then carried out for the obtained curable compositions.

TABLE 2

| Composition (Parts by weight) | | Ex. 1 | Ex. 2 | Ex. 3 | Ex. 4 | Comp. Ex. 1 |
|---|---|---|---|---|---|---|
| Polymer (A) | A-1 | 50 | 50 | 50 | 50 | |
| Polymer (P) | P-1 | | | | | 50 |
| Polymer (B) | B-1 | 50 | 50 | 50 | 50 | 50 |
| Plasticizer | LBU-25 [1] | | | 20 | | |
| | UP-1020 [2] | | | | 20 | |
| Filler | Hakuenka CCR [3] | | 30 | 30 | 30 | |
| | Nanox #30 [4] | 70 | 40 | 40 | 40 | 70 |
| Thixotropic agent | Disparlon 6500 [5] | 1 | 1 | 1 | 1 | 1 |
| Antioxidant | Irganox245 [6] | 1 | 1 | 1 | 1 | 1 |
| Dehydrating agent | A-171 [7] | 5 | 5 | 5 | 5 | 5 |
| Adhesiveness imparting agent | KBM-603 [8] | 5 | 5 | 5 | 5 | 5 |

TABLE 2-continued

| Composition (Parts by weight) | | Ex. 1 | Ex. 2 | Ex. 3 | Ex. 4 | Comp. Ex. 1 |
|---|---|---|---|---|---|---|
| Curing catalyst | Neostann U-810 [9] | 0.3 | 0.3 | 0.3 | 0.3 | 0.3 |
| Viscosity (Pa·s) 23° C. | 2 rpm | 230 | 680 | 430 | 400 | 190 |
| | 10 rpm | 170 | 330 | 200 | 190 | 130 |
| Tensile properties | M50 (MPa) | 4.4 | 3.4 | 1.7 | 2.1 | 5.6 |
| | TB (MPa) | 6.9 | 5.8 | 3.8 | 4.3 | 8.2 |
| | EB (%) | 97 | 133 | 191 | 160 | 71 |
| Tensile shear strength (MPa) | Aluminum | 8.5 | 7.6 | 5.6 | 5.6 | 9.0 |
| | PC | 4.0 | 4.2 | 2.5 | 4.2 | 1.2 |
| | ABS | 3.0 | 3.7 | 2.8 | 3.0 | 2.2 |

[1] Polyoxypropylene derivative (Sanyo Kasei Ltd.)
[2] Poly(meth)acrylic acid ester (Toa Gosei Co., Ltd.)
[3] Fatty acid-treated colloidal calcium carbonate with primary particle diameter of 0.08 μm (Shiraishi Kogyo Kaisha, Ltd.)
[4] Heavy calcium carbonate with primary particle diameter of 0.7 μm (Maruo Calcium Co., Ltd.)
[5] Fatty acid amide wax (Kusumoto Chemicals, Ltd.)
[6] Antioxidant (BASF)
[7] vinyltrimethoxysilane (Momentive)
[8] N-(2-aminoethyl)-3-aminoproipyltrimethoxysilane (Shinetsu Chemical Co., Ltd.)
[9] Dioctyl tin dilaurate (Nitto Kasei Co., Ltd.)

From the comparison of Examples and Comparative Examples based on Table 2, it is found that the curable composition containing the polymer (A) has favorable adhesiveness to a metal and plastics.

Examples 5 to 7 and Comparative Examples 2 to 3

One-component type curable composition was prepared in the same manner as Example 1 except that two kinds selected from the polymer (A), the polymer (B), and the polymer (P), a filler, a thixotropic agent, an anti-oxidant, a dehydrating agent, an adhesiveness imparting agent, and a curing catalyst were admixed with one another at the blending ratio shown in Table 3, and the evaluation was then carried out for the obtained curable compositions. With regard to the tensile shear strength, the break state of a cured product was expressed as follows: CF for aggregation break, AF for interface break, and ratio of each break state when both of them are mixedly present. When aggregation break is 30% and interface break is 70%, for example, it is described as "C30A70".

TABLE 3

| Composition (Parts by weight) | | Ex. 5 | Ex. 6 | Ex. 7 | Comp. Ex. 2 | Comp. Ex. 3 |
|---|---|---|---|---|---|---|
| Polymer (A) | A-1 | 50 | | 50 | | |
| | A-2 | | 50 | | | |
| Polymer (P) | P-1 | | | | 50 | |
| | P-2 | | | | | 50 |
| Polymer (B) | B-1 | 50 | 50 | | | |
| | B-2 | | | 50 | 50 | 50 |
| Filler | Nanocoat S25 [1] | 40 | 40 | 40 | 40 | 30 |
| Thixotropic agent | Diesparlon 6500 [2] | 1 | 1 | 1 | 1 | 1 |
| Antioxidant | Irganox245 [3] | 1 | 1 | 1 | 1 | 1 |
| Dehydrating agent | A-171 [4] | 3 | 3 | 3 | 3 | 5 |
| Adhesiveness imparting agent | KBM-603 [5] | 5 | 5 | 5 | 5 | 5 |

TABLE 3-continued

| Composition (Parts by weight) | | Ex. 5 | Ex. 6 | Ex. 7 | Comp. Ex. 2 | Comp. Ex. 3 |
|---|---|---|---|---|---|---|
| Curing catalyst | Neostann U-810 [6] | 0.3 | 0.3 | 1 | 1 | 0.3 |
| Viscosity (Pa·s) 23° C. | 2 rpm | 96 | 90 | 70 | 70 | 180 |
| | 10 rpm | 85 | 78 | 60 | 55 | 135 |
| Tensile properties | M50 (MPa) | 1.9 | 1.2 | 2.1 | 1.9 | 2.2 |
| | TB (MPa) | 6.0 | 4.5 | 5.5 | 6.6 | 5.2 |
| | EB (%) | 260 | 190 | 220 | 120 | 230 |
| Tensile shear strength (MPa) | Aluminum | 6.5 (CF) | 5.0 (CF) | 5.5 (CF) | 6.1 (CF) | 6.0 (CF) |
| | PC | 3.5 (C30A70) | 4.0 (CF) | 4.0 (CF) | 1.7 (AF) | 3.0 (AF) |
| | ABS | 3.6 (C30A70) | 4.0 (CF) | 3.7 (CF) | 1.7 (AF) | 2.2 (AF) |

[1] Heavy calcium carbonate with primary particle diameter of 1 μm (Maruo Calcium Co., Ltd.)
[2] Fatty acid amide wax (Kusumoto Chemicals, Ltd.)
[3] Antioxidant (BASF)
[4] vinyltrimethoxysilane (Momentive)
[5] N-(2-aminoethyl)-3-aminoproipyltrimethoxysilane (Shinetsu Chemical Co., Ltd.)
[6] Dioctyl tin dilaurate (Nitto Nasei Co., Ltd..)

From the comparison of Examples and Comparative Examples based on Table 3, it is found that the curable composition containing the polymer (A) has favorable adhesiveness to a metal and plastics. With regard to Example 6, the curable composition having the polymer (A-2) in which a macromonomer containing alkyl (meth)acrylate with alkyl carbon atom number of 1 to 6 and alkyl (meth)acrylate with alkyl carbon atom number of 7 to 30 is copolymerized exhibited favorable adhesiveness compared to Example 5. With regard to Example 7, the curable composition which has the polymer (B-2) containing a bifunctional reactive silicon group (a group of the general formula (1) in which a is 1) exhibited favorable adhesiveness compared to the curable composition of Example 5 which has the polymer (B-1) containing a trifunctional reactive silicon group (a group of the general formula (1) in which a is 0).

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

The invention claimed is:
1. A curable composition comprising: a (meth)acrylic acid ester polymer (A); and a polyoxyalkylene-based polymer (B),
wherein the (meth)acrylic acid ester polymer (A) comprises, as constituent monomers, a monomer and a macromonomer (a),
wherein the monomer comprises a reactive silicon group represented by the general formula (1):

(in the formula, $R^1$ represents a substituted or unsubstituted hydrocarbon group with 1 to 20 carbon atoms, X each independently represents a hydroxyl group or a hydrolyzable group, and a represents 0 or 1.)
and a polymerizable unsaturated group,
wherein the macromonomer (a) is a (meth)acrylic acid ester polymer having a polymerizable unsaturated group,
wherein a content of the macromonomer (a) in the constituent monomers is 10 to 50% by weight, and wherein the polyoxyalkylene-based polymer (B) comprises a reactive silicon group represented by the general formula (1).

2. The curable composition according to claim 1, wherein, with regard to the reactive silicon group contained in the polyoxyalkylene-based polymer (B), a in the general formula (1) is 1.

3. The curable composition according to claim 1, wherein the macromonomer (a) has a molecular weight distribution (Mw/Mn) of 1.5 or less, a glass transition temperature (Tg) of lower than 50° C., and a number average molecular weight of 1,000 to 30,000.

4. The curable composition according to claim 1, wherein Tg of the macromonomer (a) (branch chain) is lower than Tg of a stem chain constituting the (meth)acrylic acid ester polymer (A).

* * * * *